US005416823A

United States Patent [19]
Livingston

[11] Patent Number: 5,416,823
[45] Date of Patent: May 16, 1995

[54] SYSTEM FOR MAKING PRINTED DATA ON X-RAY FILM

[75] Inventor: Troy W. Livingston, Northbrook, Ill.

[73] Assignee: Livingston Products, Inc., Wheeling, Ill.

[21] Appl. No.: 158,602

[22] Filed: Nov. 24, 1993

Related U.S. Application Data

[63] Continuation-in-part of Ser. No. 68,059, May 27, 1993, abandoned.

[51] Int. Cl.⁶ .............................................. H05G 1/28
[52] U.S. Cl. ..................................... 378/166; 378/165
[58] Field of Search ............... 378/166, 162, 165, 169, 378/170, 204, 206

[56] References Cited

U.S. PATENT DOCUMENTS

| | | | |
|---|---|---|---|
| 3,614,917 | 10/1971 | Wenthe et al. | 95/1.1 |
| 3,628,864 | 12/1971 | Fessenden et al. | 355/18 |
| 3,962,585 | 6/1976 | Huttner et al. | 250/476 |
| 4,383,329 | 5/1983 | Krobel et al. | 378/166 |
| 4,520,497 | 5/1985 | Kluge et al. | 378/166 |
| 4,739,480 | 4/1988 | Oono et al. | 364/414 |
| 5,136,626 | 8/1992 | Ort | 378/165 |
| 5,311,567 | 5/1994 | Pellegrino et al. | 378/166 |

FOREIGN PATENT DOCUMENTS 0443373  8/1991  European Pat. Off. .

*Primary Examiner*—David P. Porta
*Assistant Examiner*—Don Wong
*Attorney, Agent, or Firm*—Fitch, Even, Tabin & Flannery

[57] ABSTRACT

An X-ray film marking unit for exposing a portion of the film with a label having indicia relating to patient identifying and X-ray machine identifying information. A computer or microprocessor system is fully integrated as part of a smart marking system which may retrieve data from various sources via digital interface ports. Three modes of operation, full-automatic, semi-automatic and stand-alone, are utilized for data retrieval.

19 Claims, 23 Drawing Sheets

| Fig. 10A | Fig. 10B |
| --- | --- |
| Fig. 10C | Fig. 10D |

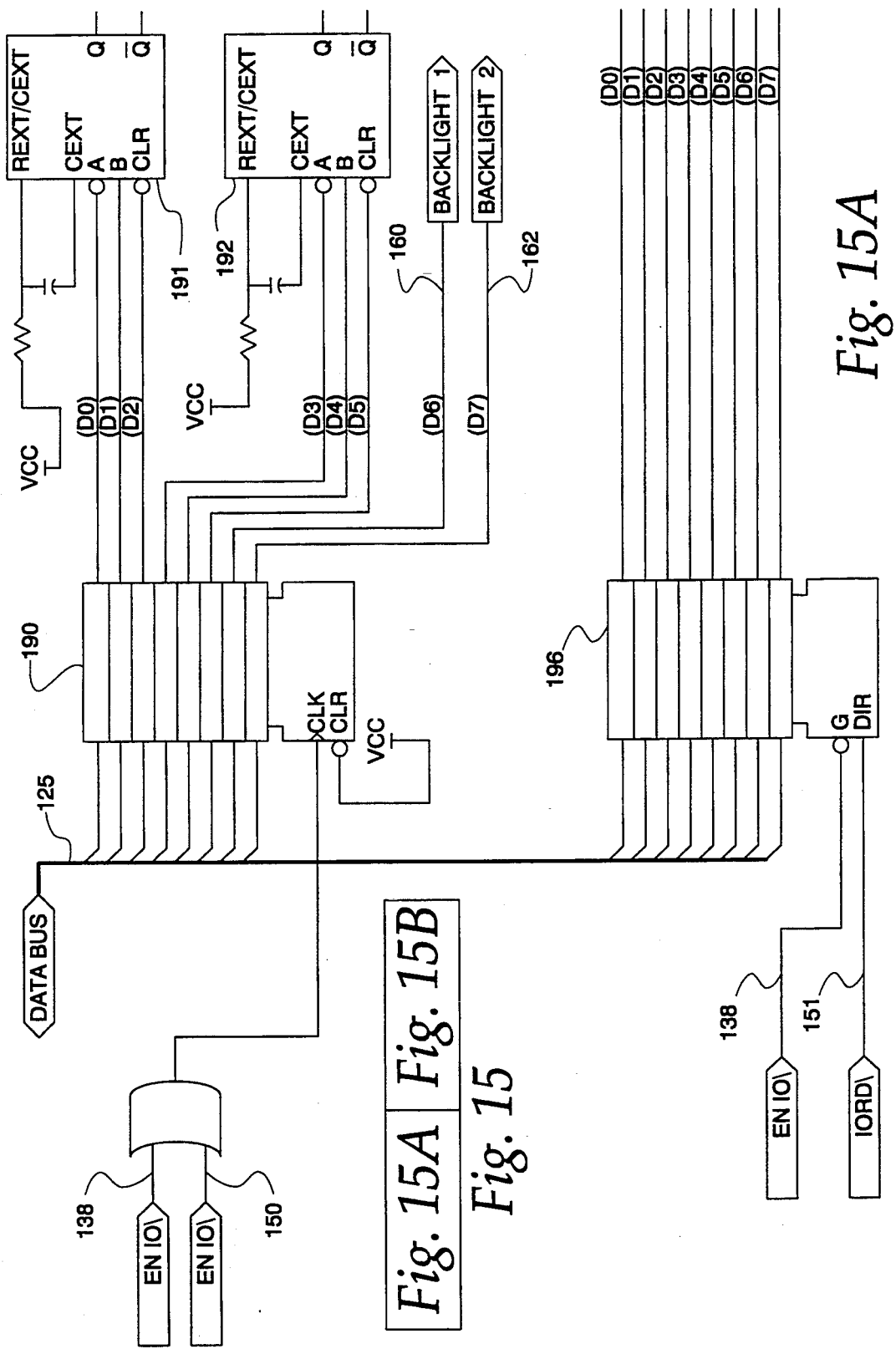

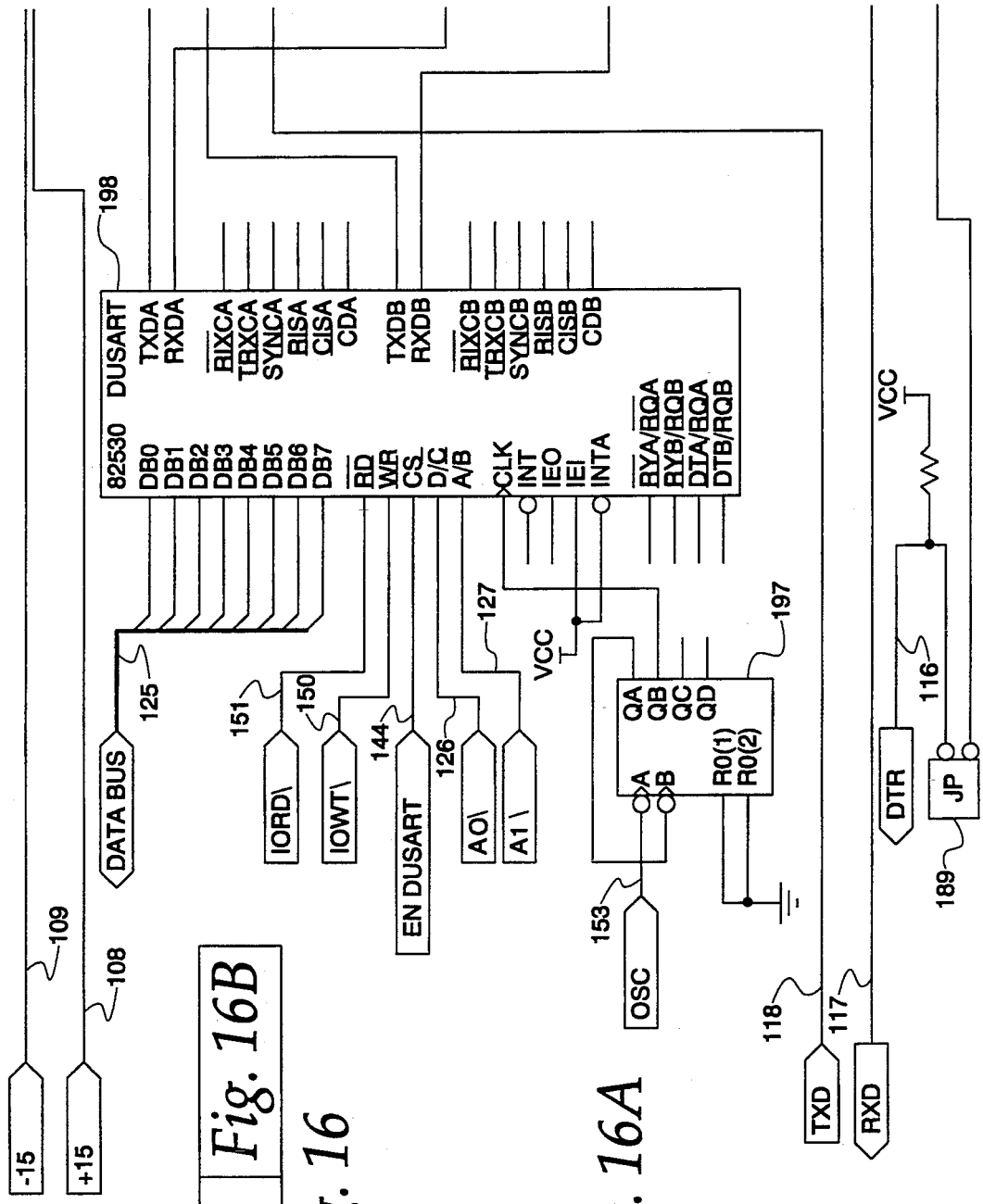

SYSTEM FOR MAKING PRINTED DATA ON X-RAY FILM

CROSS-REFERENCE TO RELATED APPLICATION

This application is a continuation-in-part of application Ser. No. 068,059 filed May 27, 1993, abandoned.

BACKGROUND OF THE INVENTION

This invention relates to a method of and an apparatus for printing patient information on an X-ray film carried in an X-ray cassette. More particularly, the invention relates to computer controlled systems for collecting and printing patient identifying and X-ray machine identifying information on X-ray film and storing the same for archival purposes and to ensure the integrity of such information.

Many X-rays, such as mammographic X-rays of breasts, are performed on an X-ray machine that uses an X-ray film holder called a cassette that slides into and out of a support on the X-ray machine. The typical cassette is a rectangular flat package that is hinged at one end to open to allow access to an internal foam pad on which is laid an X-ray film sheet that will receive the X-ray image. Currently, most such cassettes also have a narrow window slide in one corner of the cassette that is slid open to expose the film for printing patient data through the window onto the film.

Typically, the patient data of interest includes identity, time and location information and the X-ray machine data of interest includes the type of view, the operating parameters and other information relating to the X-ray machine. For a mammogram X-ray, it may be desired to set forth in four to six rows of information: the clinic name, date, time, patient name and identification number, exposure number, voltage used, exposure time, mode, technique used, angle of C-arm, breast thickness, compression force, filter and dosage. The letters to be printed are about newspaper size lettering; and the letters need to be nice, crisp and clear. The letters are white on an exposed, black background and may have to be printed in a space that is only 0.5 inch in height and 2.5 inches in length.

Currently, X-ray film is being marked by systems in which the information is furnished on data carrier cards and liquid crystal displays (LCDs) which are illuminated to project the information onto the film. Such systems have been designed to use data carrier cards or liquid crystal displays or some combination thereof.

A system employing data carrier cards provides a label printed with the desired information and attached to an IBM perforation card which is placed into an exposure unit along with the X-ray cassette. An electrically operated finger slides the cassette window slide to an open position to provide the window through which light is flashed to expose the letters on the film. The slide is then closed and the cassette is removed from the exposure unit, as is the IBM card bearing the information label thereon.

Since it sometimes occurs that cassettes and IBM cards are inadvertently mixed such that the film is marked with incorrect information, it has been found desirable to provide an indication of precise date and time information with the exposure. Previously, a timer disk driven by a motor has been mounted adjacent the data carrier card to project such information. However, such timer disks are bulky and the information provided thereby is often highly inaccurately and cannot be readily deciphered by a physician. To this end, U.S. Pat. No. 4,383,329 to Kröbel et al. entitled "Apparatus for Recording Data on X-ray Films or the Like," issued May 10, 1983, proposed providing a liquid crystal-type digital clock display including a digital calendar and counter adapted for use in an exposure unit to mark film with such information. By proposing both a data carrier card and a liquid crystal display, Kröbel et al. would provide marking of patient and X-ray machine identification information, along with time information.

The separate act of providing a label with the desired information and attaching it to an IBM card and then positioning the card in the exposure unit results in a system which is slow and expensive. U.S. Pat. No. 5,136,626 to Ort, entitled "Method for Identifying X-ray Film with Patient Information Displayed Outside a Cassette," issued Aug. 4, 1992, proposed adding a liquid crystal display as an integral component to a cassette to perform the function of the data carrier card. The Ort cassette has a number of control contacts allowing information to be transferred to the display from a data processing unit having a user keyboard for entry of such information.

Today, information which might be found useful for marking on X-ray film is available from a wide variety of data sources. Such sources include computers which might reside in the medical setting, including main frames in personal computers, and also some X-ray machines which provide for a digital interface allowing access to machine data. Prior art exposure units, however, are designed to receive information provided by a human operator, requiring that the operator transcribe all such information, which is tedious and subject to human error. It would be desirable, therefore, to take advantage of the various data sources available by retrieving data directly from the source, whether it be an interface computer, an X-ray machine or both. Thus, there exists a need for a new and improved system for marking patient and X-ray machine identifying information on X-ray films in cassettes.

Preferably, an improved marking system should include an exposure unit which is easy to use, both as a stand-alone unit and with remote apparatus interfaced thereto. It would therefore be further desirable to provide a "smart" marking system which itself includes a computer or microprocessor, facilitating efficient retrieval of information from the various data sources. Rather than merely receiving information, a smart marking system could directly retrieve information from data sources. As such, a smart marking system might include various interface ports, allowing the system to interrogate for the presence or absence of information sought for marking. Establishing a hierarchy of data sources as inputs would allow for the automatic and/or semi-automatic operation of the smart system to optionally look for patient and X-ray machine information from the computer interface, the X-ray machine interface or the user keyboard in the absence of data from computer or machine interfaces.

Under new regulations, the X-ray data and the patient identification data must be printed on the X-ray film prior to removal of the X-ray film from the cassette. A large number of mammography and chest X-ray machines exist today and are in use without having any way of printing such information on the X-ray film. The present invention is directed to solving this problem by providing a stand-alone apparatus that can be used, for example, in a clinic in connection with one or several mammography machines that have no computer output capability. In order to be effective, the flasher apparatus has to be low-cost in comparison to the mammography machines which typically cost about $60,000 to $80,000. Preferably, the flasher apparatus should cost less than a tenth of this cost range. In addition to being cost effective, the flasher apparatus must be relatively foolproof; and yet, simple to operate, and fast in operation. That is, the apparatus should check that cassette is properly positioned and that window slide is fully opened before a flashing operation is done. Also, to prevent a repeated erroneous operation, it is desired that the flasher flash patient information only once and not be capable of repeating an erroneous flash of a patient's data onto a succeeding cassette of another, subsequent patient. The preferred apparatus should be capable of operating the three modes of manual only; semi-automatic with some information coming from a remote computer such as patient data from a hospital main frame and X-ray parameter data generated by the keyboard; and fully automatic with all of the information coming from a computer associated with the mammography machine.

SUMMARY OF THE INVENTION

In accordance with the present invention there is provided a stand-alone flasher apparatus exposing and printing on an X-ray film in a cassette the patient and X-ray machine identifying information. The stand-alone unit may be placed next to one or more mammography machines; and, after an X-ray exposure, the cassette may be removed from the mammography machine and placed in the adjacent flasher unit. The patient and X-ray data may be typed on a keyboard of the flasher apparatus and in a short period of time, e.g., three seconds, the typed information is flashed onto the film. There may be as much as four lines of sixty characters per line flashed onto the X-ray film. The apparatus is relatively inexpensive so that it can be purchased for use with existing mammography X-ray machines. Also, the apparatus may be used in semi-automatic or automatic modes. The optical character generator and projector is operable by electronic data signals from interface ports retrieving such signals from a remote apparatus such as an X-ray machine and input data means, such as typewriter keyboard and/or stored signals from a computer. Thus, it is electrical signals that are retrieved directly from data sources to operate the optical character generator and projector which may comprise a plurality of light crystal displays (LCD's) that are back lit. A lens system is used for focusing the print image onto the X-ray film for a predetermined period of time which may be controlled by a shutter or the like, or by inhibiting the back light.

The preferred system also includes a microprocessor or computer which can control the electrical operation of actuators to open and close the window slide on the cassette and control the time of exposure and operation of the LCD's. The microprocessor may also have stored data therein such as the name of the clinic and generate data such as time and date which operates the LCD's to display this data. The electrical signals to operate the optical character generator and projector also may come from remote locations such as a bar code reader, a magnetic tape reader or over a cable from an X-ray machine or another remote apparatus such as a main computer for the clinic or hospital.

In the preferred and illustrated system, the operator slides a cassette into position in the marker unit and a lever is operated for mechanically locking the X-ray film cassette in place, opening the cassette window and notifying that the film is ready for exposure. Once the lever is activated, it is not possible to remove the cassette from the system until the lever is deactivated.

The marking system first looks for patient identifying information through data interface ports which may retrieve such information from remote computer and/or X-ray machine apparatus. If patient identifying information is available through the data interface ports, then it is retrieved thereby for exposure. Otherwise, the required patient identifying information is sought through the user keyboard by the system which prompts a human operator. Second, the system looks for X-ray machine identifying information through the data interface ports. If such information is also available thereby, then it is retrieved for exposure. If X-ray machine data is unavailable through the data interface ports, then again the human operator is prompted for entry of such information via the keyboard. In this context, the "full-automatic mode" of operation of the smart marking system contemplates retrieval of both patient and X-ray machine identifying information through the data interface ports without human interaction. "Semi-automatic mode" on the other hand, is when either patient or X-ray information is retrieved via remote apparatus and remaining required information is retrieved via the human operator. When all such information (both patient and X-ray) is obtained by prompting a human operator, then the system's operation is referred to as "stand-alone mode." For a given location, however, even in stand-alone mode, clinic name, date, time, etc. are read from the memory and the system clock of the microprocessor or computer which controls, and is incorporated within, the smart marking system. Also, it is often desirable to include sequential indicia for quality control, and film density for X-ray machine calibration.

An external user display is provided to indicate the status of the marking system, e.g., whether exposure is complete, system errors, etc. In the stand-alone mode of operation, this display is particularly useful for data entry by the user typist. The display facilitates a man-machine interface by prompting for user input and allows some limited editing by the user prior to exposure.

When the typist and/or other data input means has the appropriate data inputted to the LCD's to produce the print image, the operator causes the printing to begin and then the print image which is sent through a lens system and through the window to expose the film. Preferably, a back light is flashed on and then off for the exposure time. The exposure time when using LCDs may be about one-third of a second which is a long exposure time compared to photographic camera exposure times. Exposure time also varies with film density and the intensity of the back light, thus a light sensor or photo diode may be advantageously employed to vary the exposure time with light intensity. The marking system of the present invention will not allow a second exposure of an inserted X-ray film cassette.

In the embodiment utilizing the above described lever, the film cassette is removed after the lever is deactivated, as previously described. START During the printing operation, it is preferred to block the cassette against movement and removal until the printing is completed and this may also be done by a solenoid-operated device.

The utilization of a microprocessor or computer fully integrated into the smart marking system provides additional advantages. Such advantages provided by this integrated system include added security through password protection, long-term storage of data within computer memory, and the ability to connect to a printer to output some or all of the data from exposures performed in a given time frame, e.g., end of day hard copy printouts. The details of the invention together with further advantages are set forth in the detailed description which follows. The precise scope of the invention is defined by the claims annexed to and forming a part of this specification.

DESCRIPTION OF THE DRAWINGS

FIGS. 15A and 15B are schematic diagrams of solenoid control and input switch circuitry;

DETAILED DESCRIPTION OF THE PREFERRED EMBODIMENT

Figure 1:
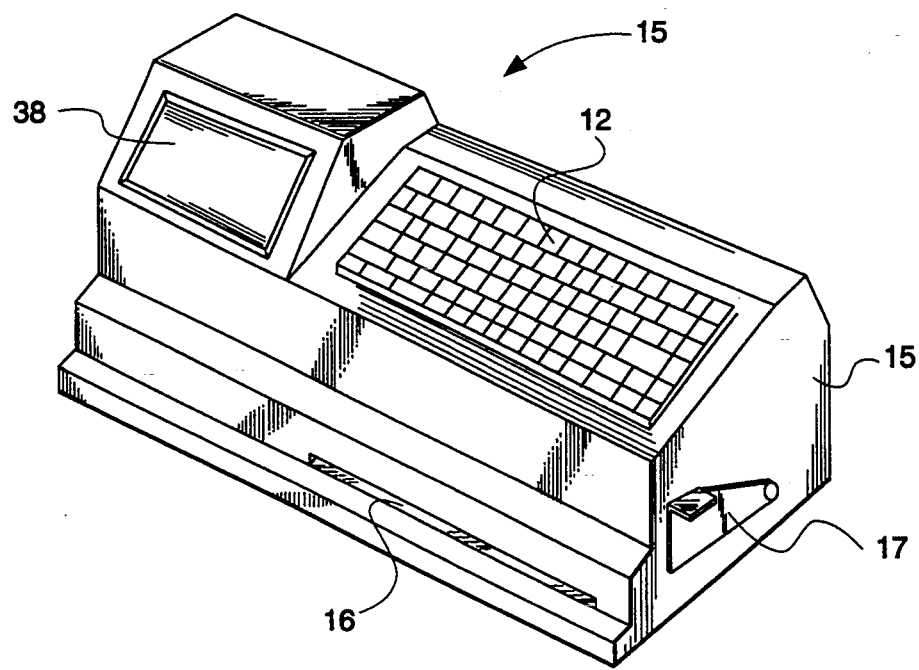
FIG. 1 is a perspective view of a housing for imprinting on an X-ray cassette having a window.
Figure 7A:
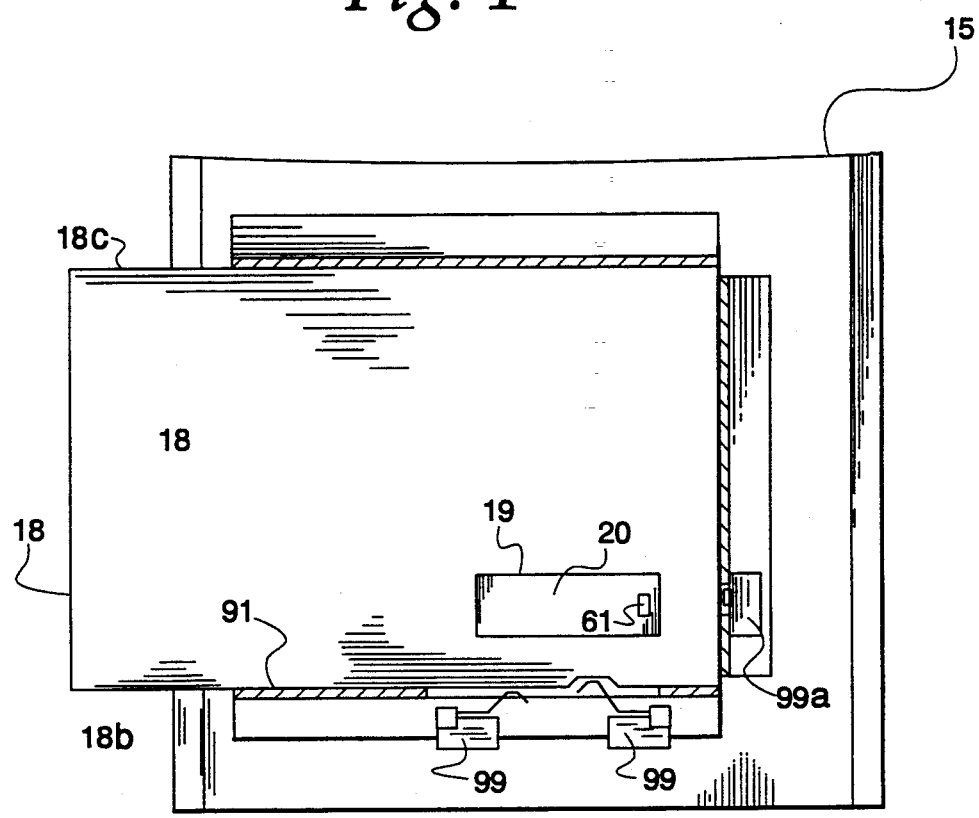
FIG. 7A illustrates input switches sensing a cassette properly positioned for printing through a window therein.

As shown in the drawings for purposes of illustration, the invention is embodied in a flasher system or apparatus 10 that includes a housing 15 (FIG. 1) having a slot 16 into which may be inserted an X-ray cassette 18, having a window 19 which is usually covered by a window slide 20, until it is desired to print on an X-ray film (not shown) inside the cassette. Under new regulations, the information or data concerning the patient and the X-ray parameters is to be printed onto the X-ray film before it is removed from the cassette. It is particularly important that there be proper correlation between the patient data and the actual cassette or else the wrong person's identification may be on two different cassettes. By way of example only, it is preferred to be able to print several lines of data, e.g., four lines of date with a substantial number of characters through a small window that may be only 0.5 inch in height and 2.5 inches in length. Typical data to be printed includes: patient identification information with respect to the location, time, data, place and operating parameters under which the X-ray was taken. The format of the information, the kind of information and the size available may vary; but herein, the printed information in a one-half (½) inch by two and one-half (2.5) inch rectangle in four (4)lines and may read, for example, as follows:

```
Clinic name clinic name 93-03-31 15:35
Patient name and ID Patient name and ID
No 99999 28 kV 219 mAs 2.10 s AEC  BUCKEY
−45 deg 6.5 cm 22 kg Rh
```

In the first row is the clinic's name followed by the date and time the X-ray was taken. In line 2 above, the patient's name and identification number are printed. In line 3, there is a five-digit exposure number followed by the operating voltage in kV and intensity in mAs (milliampseconds). Also, in line 3 is exposure time of "2.10 s" and the exposure mode AEC (which stands for an automatic exposure mode). The last time "Buckey" in line 3, refers to where the cassette was located. For example, on a Buckey plate, or alternatively it may state "Magn" for magnification, or "3-D Bios" for a stereotaxic machine. In line 4, the "45 deg" refers to the C-arm of the X-ray machine being rotated at 45° to the horizontal. The 6.5 cm refers to thickness of the breast, and the 22 kg refers to the compression force exerted on the breast. "Rh" refers to the filter used. Manifestly, other identifying indicia as may be desired can be used; for instance, the initials of the lab technician or the like.

Figure 2:
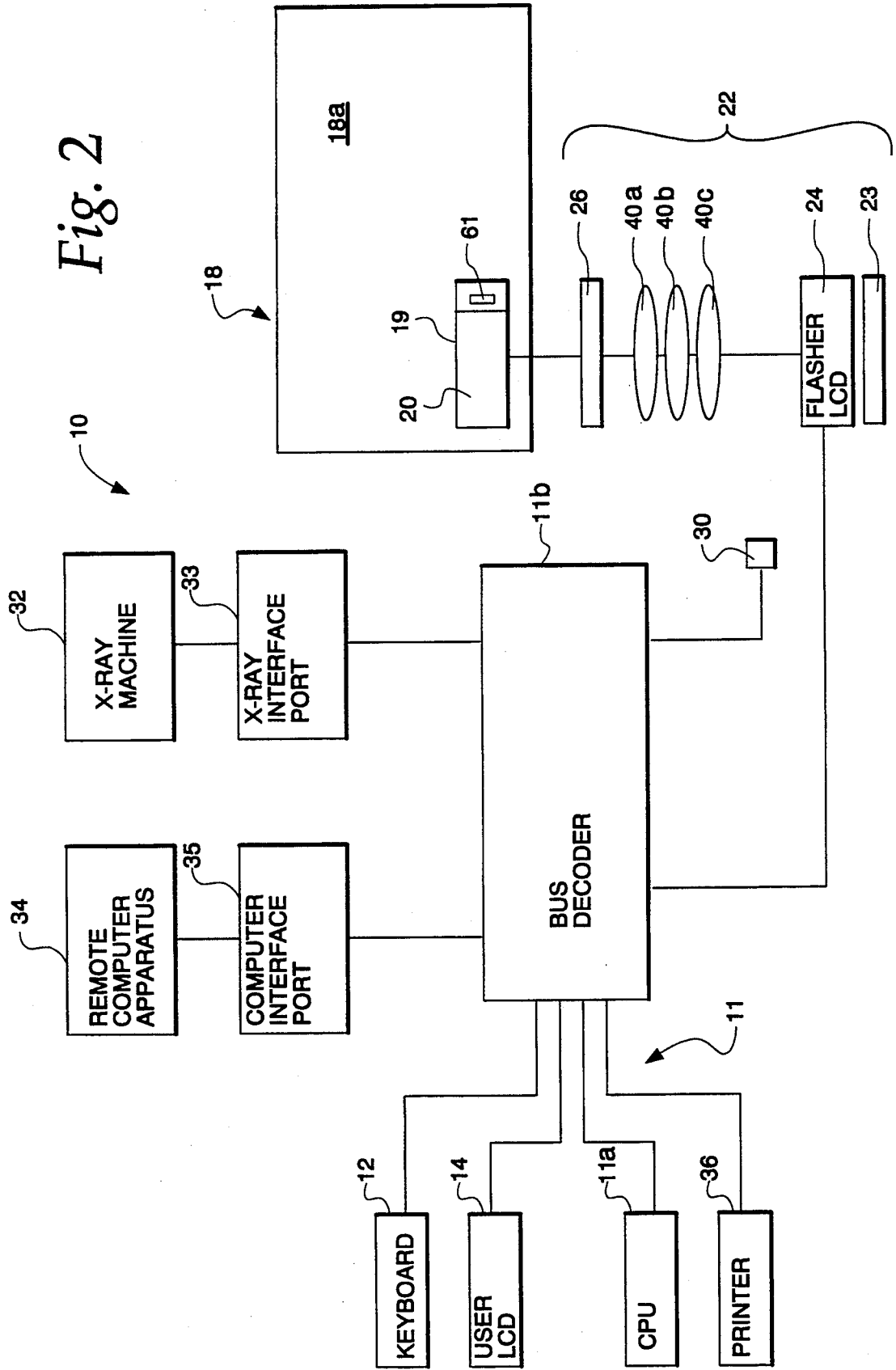
FIG. 2 is a diagrammatic view of the preferred apparatus for practicing the invention.

The cassette 18 (FIG. 8) has the window 19 in its top wall 18a which, when the window is uncovered, exposes an X-ray film 18 (FIG. 2) at the window for printing. After printing, the window slide 20 is closed to prevent exposure of the printed lines which are white letters on a black film background. The size of the window defines the maximum size of the printed message or marker that will be on the film. The cassette may be of various kinds such as a standard mammography, panoramic and cephalostat cassette. Different cassettes made by different manufacturers will have their window openings in different positions from that illustrated herein.

In accordance with the present invention, the printed image on the X-ray film is generated and projected onto the film by an optical character generator and projector 22 (FIG. 2) which is operable by electrical signals from a computer or computing means 11. In the preferred embodiment of the invention, the character generator comprises a backlight or bulb 23, which is selectively controlled to illuminate by backlighting a panel 24 of LCD's, which are operated to have the printed data thereon. The image from the LCD's is focused sharply on the film by a lens means 25 and filter 26. The lens means focuses the image onto the film to give crisp, clear and sharp letters; and the filter provides a good contrast so that white letters exposed on the X-ray film can be easily read.

Turning now in greater detail to the illustrated apparatus 10, there is a housing or frame 15 that includes the receiving slot 16 (FIG. 1) for reception of the cassette 18. The illustrated unit or apparatus 10 is small, stand-alone unit that may be placed on a table or mounted on a wall or on an X-ray unit. By way of example only, the housing 15 of the unit may be about 24 cm in width, 10 cm in depth, 18 cm in height and under 4 kg in weight.

In accordance with the invention, the apparatus 10 may be a stand-alone unit that may be used with various or a number of different X-ray machines rather than being a dedicated apparatus that is incorporated into and is an integral part of a mammography machine that has its own associated computer. To this end, the flasher unit has its own computer 11 (FIG. 2) including a CPU unit 11a and a bus decoder 11b that responds to interlock or input signals indicating that the cassette is in proper position, and that the window slide is open. The computing means 11 cooperates with a keyboard 12, its own internal memory, an X-ray machine 32, or a remote computer apparatus 34 to receive the patient data above-described.

Having this data, the CPU 11a operates the LCD's 24 and the backlighting thereof to generate the data image which is flashed through the lens system 35, filter 26, and through the open window 19 to print onto the film in the cassette. When operating as a stand-alone unit, there will no inputs at the computer interface port 35 or the X-ray interface port 33 for the bus decoder 11b.

In accordance with the present invention, the apparatus has three modes of operation including the stand-alone, i.e., manual operation wherein the computer 11 and keyboard 12 provide the only inputs for character generation. In the stand-alone operation, the apparatus may serve one or several mammography X-ray machines. In another or semi-automatic mode of operation, the remote computer apparatus 34, which may be an institutional hospital main frame computer, provides the patient name, patient identification number to the computer interface port 35 and thereby to the computer 11; and the operator at the keyboard 12 will enter into the computer 11 the parameters with respect to X-ray being taken or recently taken. In the fully automatic mode, the X-ray mammography machine 32 will have its own internal dedicated computer or an attached PC computer that has all of the patient data as well as the X-ray parameter data which it sends through the computer interface port 33 to the computing means 11, which then, operates LCD backlight and LCD's to generate an image of the characters inputed from the remote X-ray machine 33 containing the patient data and X-ray parameter data.

To be cost effective as a stand-alone apparatus, the preferred apparatus 10 was constructed with its own computer or computing means 11 although a more costly, commercially available computer could have been adapted for use herein. Likewise, as will be explained, the apparatus uses a lens system, that is very inexpensive, e.g., a lens system costing $19 for a commercially available, three-element lens and uses an inexpensive yellow celluloid filter 26 to give the sharp image with good contrast to the X-ray film. It is a difficult task to design a printing system having inexpensive components to print clearly four lines having sixty characters per line in a 0.5 by 2.5 inch rectangle an X-ray film. Additionally, a low cost cassette handling mechanism operated by handle, locks the cassette 18 in place and provides a light shield about the window 19 and provides interlocks that assure that the cassette is properly oriented, is located at the proper spot, and that the window slide 20 is fully open before printing commences. More specifically, and in accordance with the present invention, the operator inserts the cassette 18 into the slot 16 to its full depth and a sensor input means 99 (FIG. 8) senses that the cassette is properly inserted and oriented and acts as an interlock to cause the operation to be stopped if the cassette is not properly positioned. After insertion of the cassette, the operator pulls the handle 17 to lock the cassette against removal during the flashing operation and to shift the window slide 20 to its open position. A light trap means about the window prevents ambient light from entering through the open window. Another input sensor 99d senses that the full stroke of the window slide 19 was attained by movement of the handle 17, and enables a printing operation. Preferably, the locking of the cassette against removal, the applying of the light seal, the pulling open of the slide, and the sensing of a fully open slide are accomplished by a simple hand-operated mechanism operable without the use of motors or the like to provide a low cost mechanism to perform these functions.

Turning now to a more detailed description of the housing 15 and the apparatus therein, the housing contains a motherboard on which are mounted the computer 11 and the interface ports 33 and 35. A visual display 38 (FIG. 1) which is preferably an array of LCD's are provided on the housing above the keyboard for viewing of the data that is to be inputed and printed onto the X-ray film. As the operator operates the keyboard, the characters being typed by the operator are displayed on the optical display 38. Also, commands or other menu information from the computer 11 will be displayed on the optical display 38 in the usual manner. Preferably, operation of the handle 17 and a proper opening of the window slide 20 results in the switch 99d closing and a message appears on the visual display that the printing operation is commenced. On the other hand, if the window is not fully opened, the switch 99d will be open and a suitable non-print command will be displayed on the visual display to the operator. The keyboard 12 has several control keys, e.g., keys that control printing and select the different modes of operation. The housing 15 may be, for example, as small as 24 cm in width, 10 cm in depth, 18 cm in height and 4 kg or less in weight.

Figure 5:
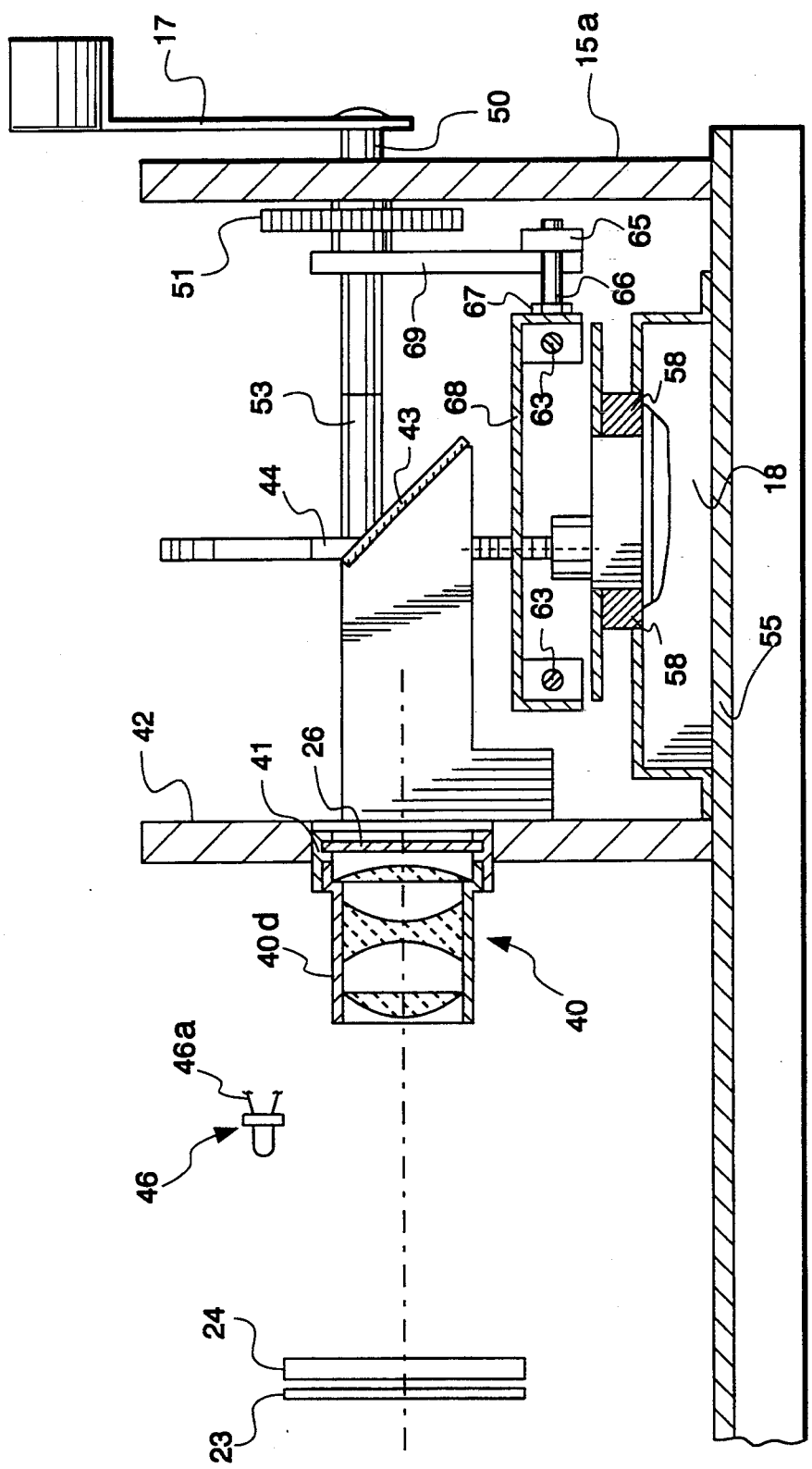
FIG. 5 is a partially cross-sectional view showing the lens system and slide carrier.

The slot 16 is preferably sufficiently wide to receive both the usual cassette used for mammography and a larger cassette used for chest X-rays. Mounted horizontally within the housing is the optical character generator and projector 22 (FIG. 5) that includes, in sequence from left to right in the housing, a backlight 23 that is connected to the computing means 11 and is electronically controlled to cause illumination of the flasher LCD's 24 which are adjacent thereto. Herein, the preferred code is an Epson printing code of electronic data signals from the computing means that operates the LCD panel for printing. The preferred, inexpensive and small LCD panel for flashing is available from Hitachi Corporation and sold under the name of Graphic Alpha Numerical EL Backlighting Part No. LMG6381QHGE. The external display 38 has another LCD unit sold by Hitachi Corporation and sold under the name of Graphic Alpha Numerical EL Backlighting Part No. LMG6401PLGE.

Manifestly, other character generators than LCD's could be used and other brands of LCD's may be used.

Figure 3:
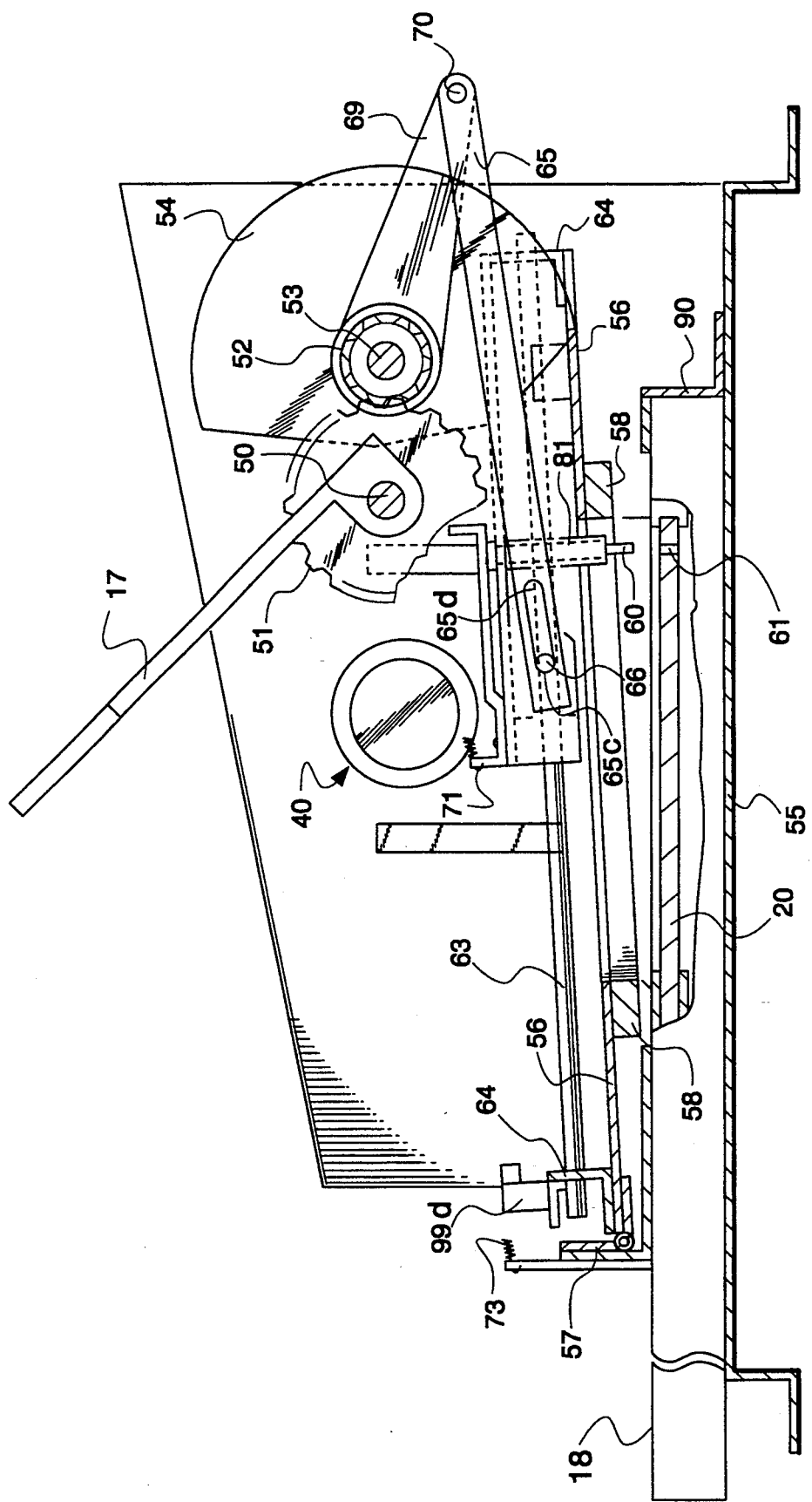
FIG. 3 is a partial sectional view of the cassette locking and slide opening mechanism in a position to receive a cassette.

A particular problem is to print with sufficient clarity, sharpness of image and suitable contrast onto the film, all in an inexpensive manner. Herein, this is achieved by the use of a suitable lens system 25 and filter 26. The preferred lens system has three lens 40a, 40b and 40c mounted in a tube 40d. The first lens 40a has a convex face 40e and a planar face 40f. The second lens 40b has convex faces 40g and 40h. The third lens 40c has a planar face 40i and a convex face 40j. The lens system is 3 inches in length and has f.25. and is commercially available from JML Optical Industries of Rochester, N.Y. While the lens system provided the sharp image, the image did not have sufficient contrast to make it easy to read on the dark X-ray film. This was overcome by the addition of a yellow filter 26 which is preferably a commercially available celluloid filter such as a Cokin Filter, A375 Fil. A made by Coromofilter SA of Paris, France. As best seen in FIG. 3, the filter 26 may be a thin disk mounted in a typical filter ring 41 threaded onto the lens tube 40d which is mounted on a frame member 42 of the housing 15.

The image is generated and projected horizontally and then is preferably reflected vertically, downwardly in this instance, by a mirror 43 (FIG. 5) that is mounted in frame brackets 44 in the housing. The mirror is mounted by the brackets directly over the window opening 19 in the cassette 18. Because the backlighting lumens may vary, for example, the amount of lumens may decay with usage and aging, it is preferred to have an optical sensor 46, such as a photocell, sense the light image to make sure that the image is sufficiently bright. The optical sensor is connected to the computer by leads 46a and suitable adjustments can be made to increase the light output of the backlight 23 or to signal that it should be replaced. Thus, there is a safeguard against a number of cassettes being flashed with the images having insufficient contrast that they cannot be read after flashing.

Figure 4:
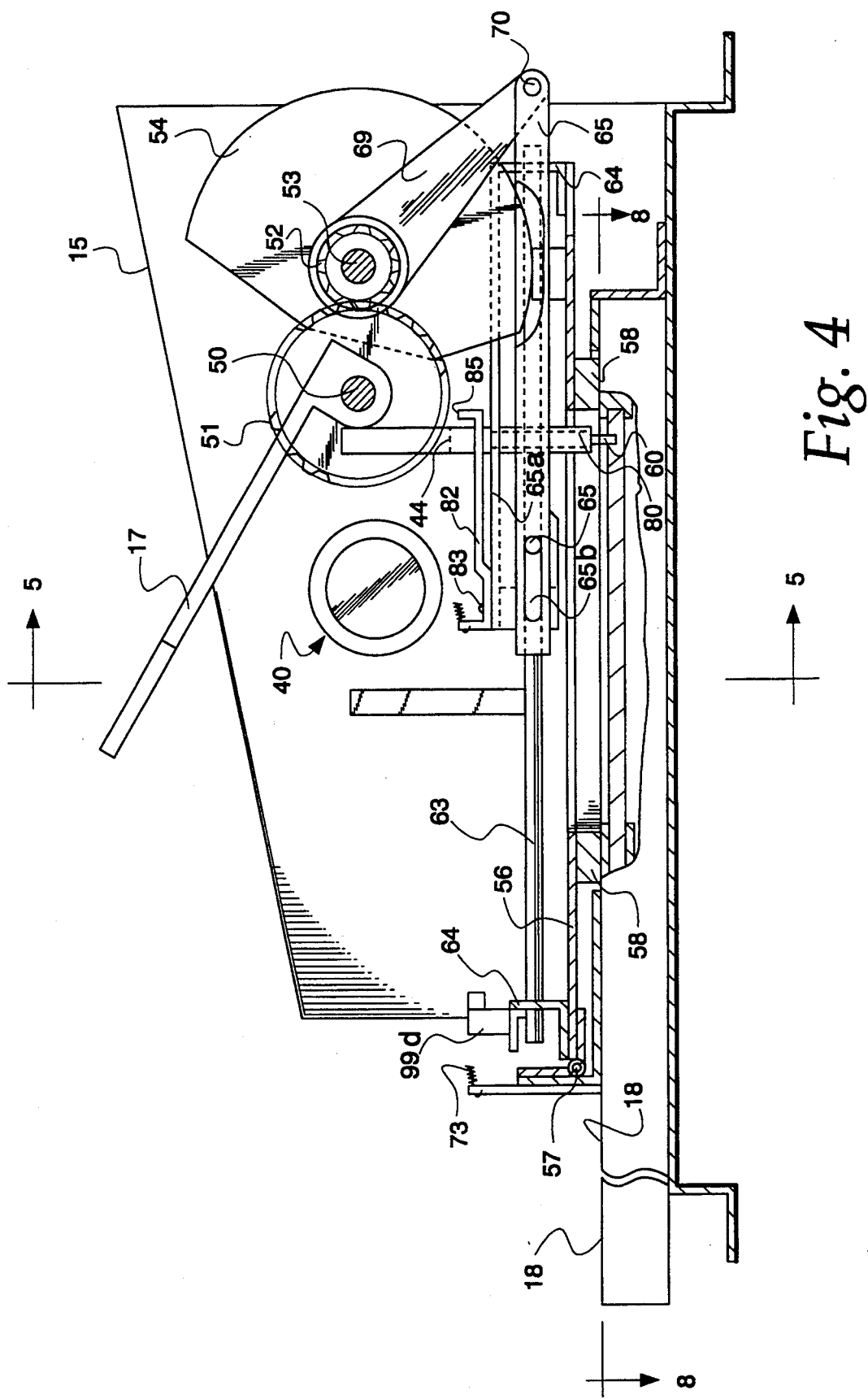
FIG. 4 illustrates the mechanism of FIG. 3 for clamping a cassette and at the beginning of an opening of the cassette window slide.

To provide a good indication to the operator that a flashing operation is being done to a cassette, and to provide a low cost mechanism, there is provided the manually-operated handle that is pulled downwardly, as viewed in FIGS. 3 and 4 by the operator, and provides the force to lock the cassette in place and to open the window slide 20. Herein, the handle is in the form of an upright lever having a lower end fixed to a turnable shaft 50 that is supported horizontally for turning about its horizontal axis by frame members of the housing 15. The upright lever is mounted exteriorly of and adjacent a righthand vertical sidewall 15a (FIG. 1) of the housing; and on the inside of this sidewall is a large gear 51 (FIGS. 4 and 5) that is meshed with a smaller gear 52 fixedly secured to a horizontal, rotatable driving shaft 53 mounted in frame members of the housing 15. Also, fixed to driving shaft is an actuator means in the form of a cam 54 that causes a locking of the cassette against removal, as will be explained later.

It is desired to lock the cassette against removal for the short period of flashing which is about three seconds in total operation of which the X-ray film exposure to the image is about 0.33 second. Herein, the locking operation is achieved by a clamping of the cassette between an underlying, horizontal housing plate 55 and an overhead clamping plate 56. The clamping plate is normally spaced from clamping engagement with the cassette so that the cassette may be easily inserted or removed from the slot 16. In its release position show in FIG. 3, the forward end of the clamping plate is raised above and spaced from the cassette and in the locking position this forward end of the clamping plate is pushed and held downwardly against the cassette by the cam 54 on the shaft 53. Herein, the clamping plate is pivotally mounted at its rear end by a hinge 57 which has a vertical leaf fixed to a frame member of the housing for turning about a horizontal pivot axis, and a substantially horizontal leaf fixed to the rearward end of the clamping plate. In the release non-clamping position of FIG. 3, the forward end is inclined upwardly above and spaced from the underlying cassette. The cam 54 is turned through the first one-third turning of the handle 17 and abuts the clamping plate and keeps pushing the clamping to pivot downwardly to clamp the cassette against the underlying frame 55, as shown in FIG. 4.

In accordance with this invention, the clamping plate has a dual function member, or pad 58, that functions as a light shield and as a clamp to resist a pulling force trying to remove the cassette 18 from the slot 16. In this instance, the pad has a rectangular opening therein as does the clamping plate 56 having an opening aligned with the cassette window to allow the image to pass through the respective openings. The preferred pad 58 is a resilient, compressible pad of elastomeric material which is compressed by the clamping plate and the cam tightly against the top of the cassette with a wide surface area contact. The compressed gasket pad 58 intimately engages the cassette top wall 18a and blocks any light paths due to any irregularities in the pad or top wall of the cassette. If the gasket pad 58 is too soft, the material may tear when a high pullout force is applied to the cassette. If the gasket pad is too hard, it will not be as effective as a seal, and the cassette may slide across this hard surface when the cassette is pulled with a high force. A good gasket material is a closed cell foam plastic about 0.100 inch thick with a 40 Durometer.

With the cassette 18 clamped, the handle 17 will now be in position to actuate a window opening and closing mechanism or means, as best seen in FIG. 4, that includes a pin 60 that has been lowered to project into an opening 61 in the window slide and thereby is connected to the window slide 20 to slide it to the left to open the window 19. The pin 60 is mounted on a slide assembly 62 which is carried by the clamping plate for rectilinear travel in the forward and rearward direction along a pair of horizontal, parallel slide rods 63 that are fixed at opposite ends to upright support blocks or brackets 64 which are secured to the top of the clamping plate 56. In order to shift the slide assembly along the rods 63, the slide assembly is driven by a lost motion link assembly which in turn is driven by further operation of the handle 17. When the handle is in the position of FIG. 4, a lost motion link 65 will be positioned so that a pushing end 65a at the right end of a lost motion slot 65b will be engaging a pin 66 projecting through the slot 65b. The pin 66b is connected by a bracket 67 to a slide assembly plate 68 of the slide assembly 62. The link 65 is driven rearwardly to the left, by a lever 69 which has its upper end fixed to the drive shaft 53. The lower end of the lever 69 is connected by a pivot pin 70 to the forward, right hand end of horizontally disposed drive link 65.

Figure 6:
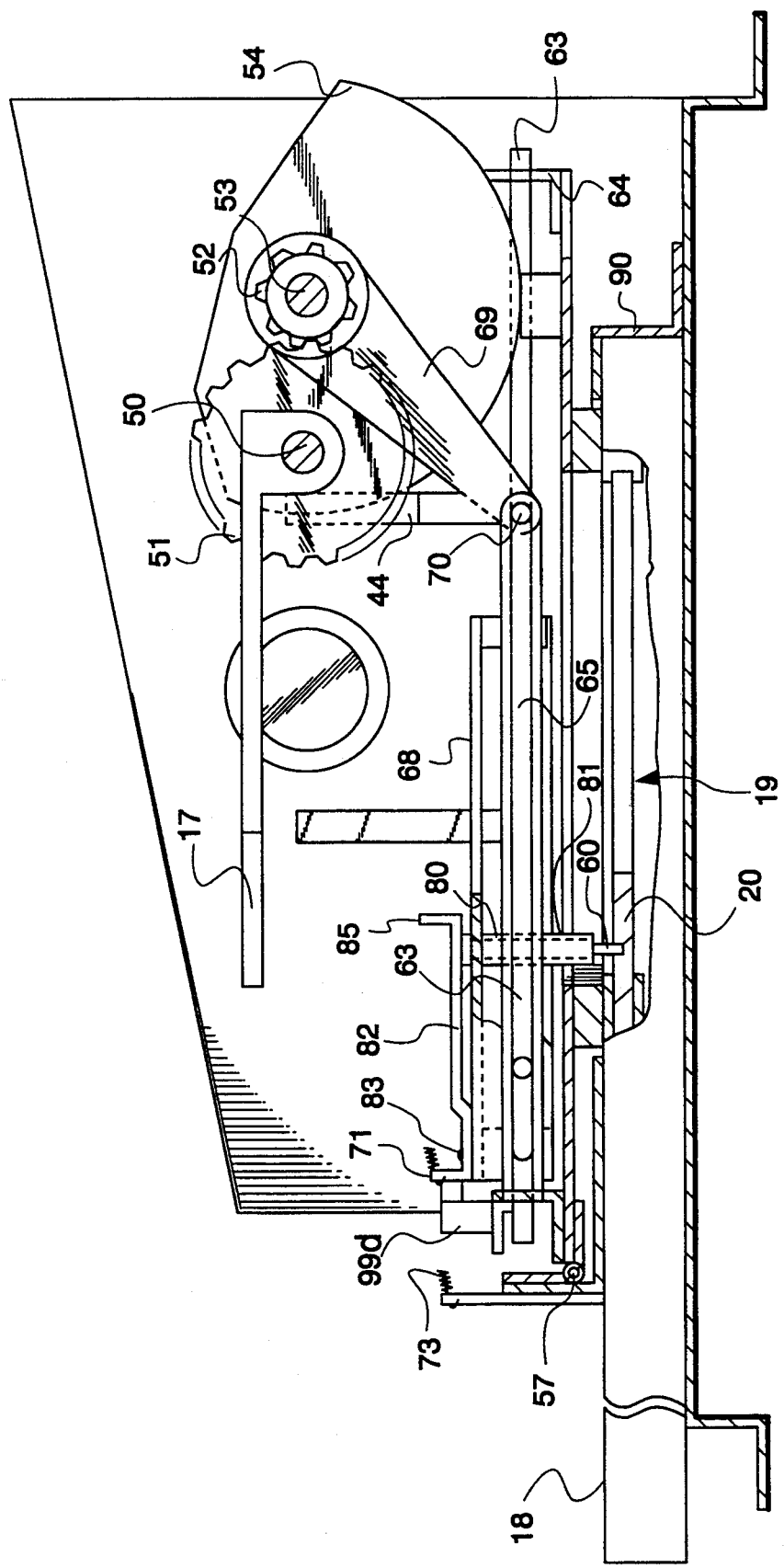
FIG. 6 is a view similar to FIG. 4 with the cassette window slide slid to open the cassette window to receive an image.

As the handle 17 turns counterclockwise, the large gear 51 turns the meshed gear 52 and turns the drive shaft 53 to turn the lever 69 clockwise to push the link to the left and to push the connecting pin 66 and attached slide assembly to the left. The slide opening pin 60 on the slide assembly is carried thereby to the left to push the cassette slide to travel to the left to uncover all of the slide window. When the slide assembly has traveled a sufficient distance to fully open the window slide as illustrated in FIG. 6, an upstanding switch actuator 71 on the slide plate abuts the limit switch 99d to signal the computing means 11 that the cassette window is open. Failure to operate the limit input switch 99d, after the other input switches 99a, 99b and 99c indicate that the cassette is properly located, causes a message to appear on the visual display 38 and/or a disablement of the optical character generator. On the other hand, a proper operation of the input switches 99a–99d enables the computing means 11 to begin or causes it to begin the printing cycle.

Figure 7:
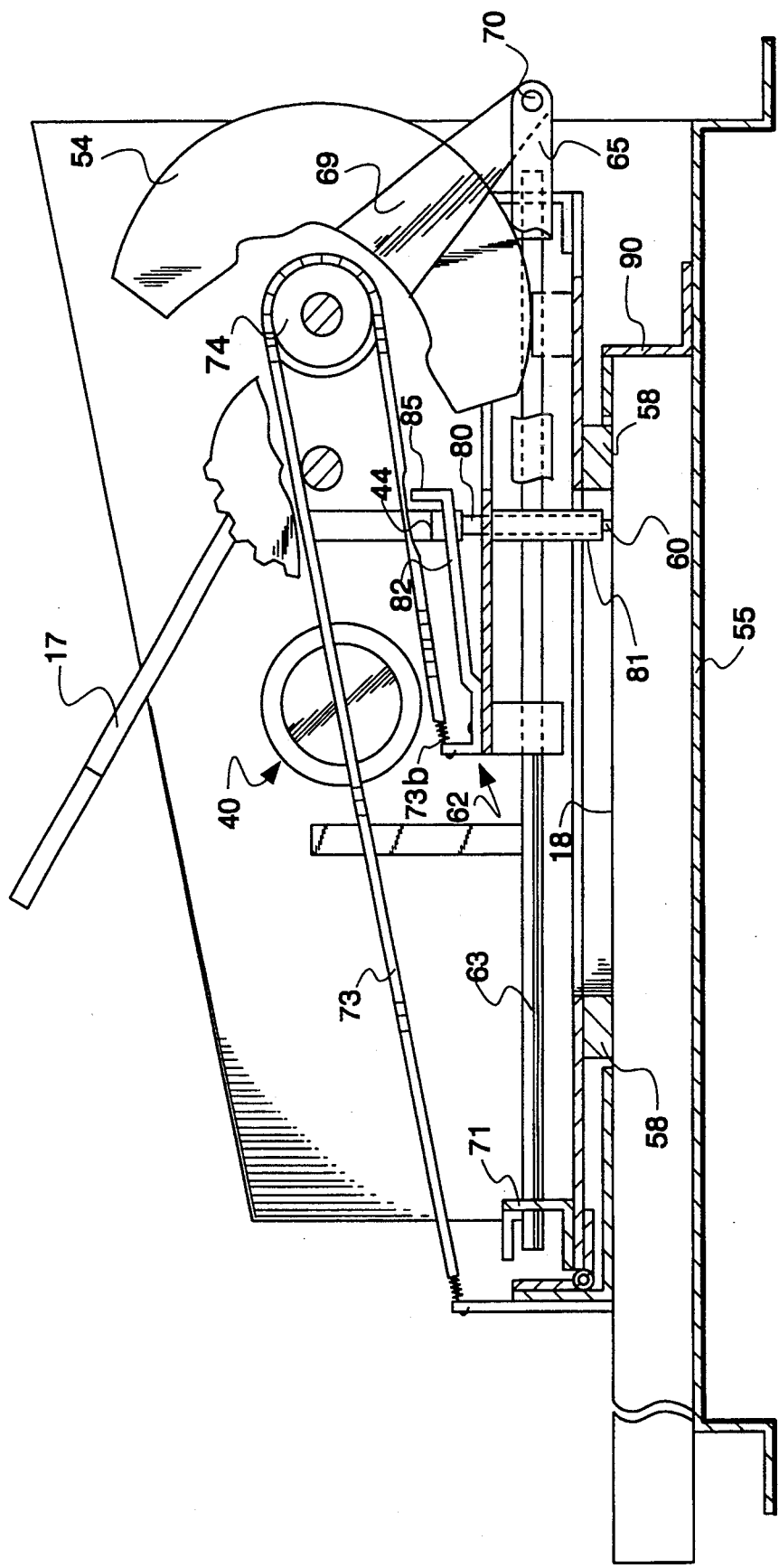
FIG. 7 shows the spring for the mechanism of FIG. 4.

After printing, the operator will lift the handle and reverse the operation described above with end 65c of the slot in the link 65 engaging the pin 66 on the slide assembly 62 forwardly, i.e., to the right, with the pin 60 pulling the slide plate 68 to the right. The slide 20 is fully closed before the cam 54 is reversed and moved from engagement with clamping plate as the handle 17 is returned fully to its upper position. As best seen in FIG. 7, a spring 73 serves to assist return of the slide assembly and to bias the forward end of the clamping plate to raise to release the cassette for removal. The illustrated spring is a long contractile spring having one end fixed to the housing frame adjacent the hinge 57 and extending therefrom over the top of the slide assembly to a grooved roller mounted on the drive shaft 53. The spring extends over the top of the grooved roller 74 to and end 73b fixed to the rear of end of the carrier slide. The portion of the spring between the grooved roller and the spring end exerts an upward force component to the slide assembly and to clamping plate to pivot the latter in a counterclockwise direction about the axis of hinge 57. This lifts the clamping plate to the release position spaced from the cassette.

Figure 8:
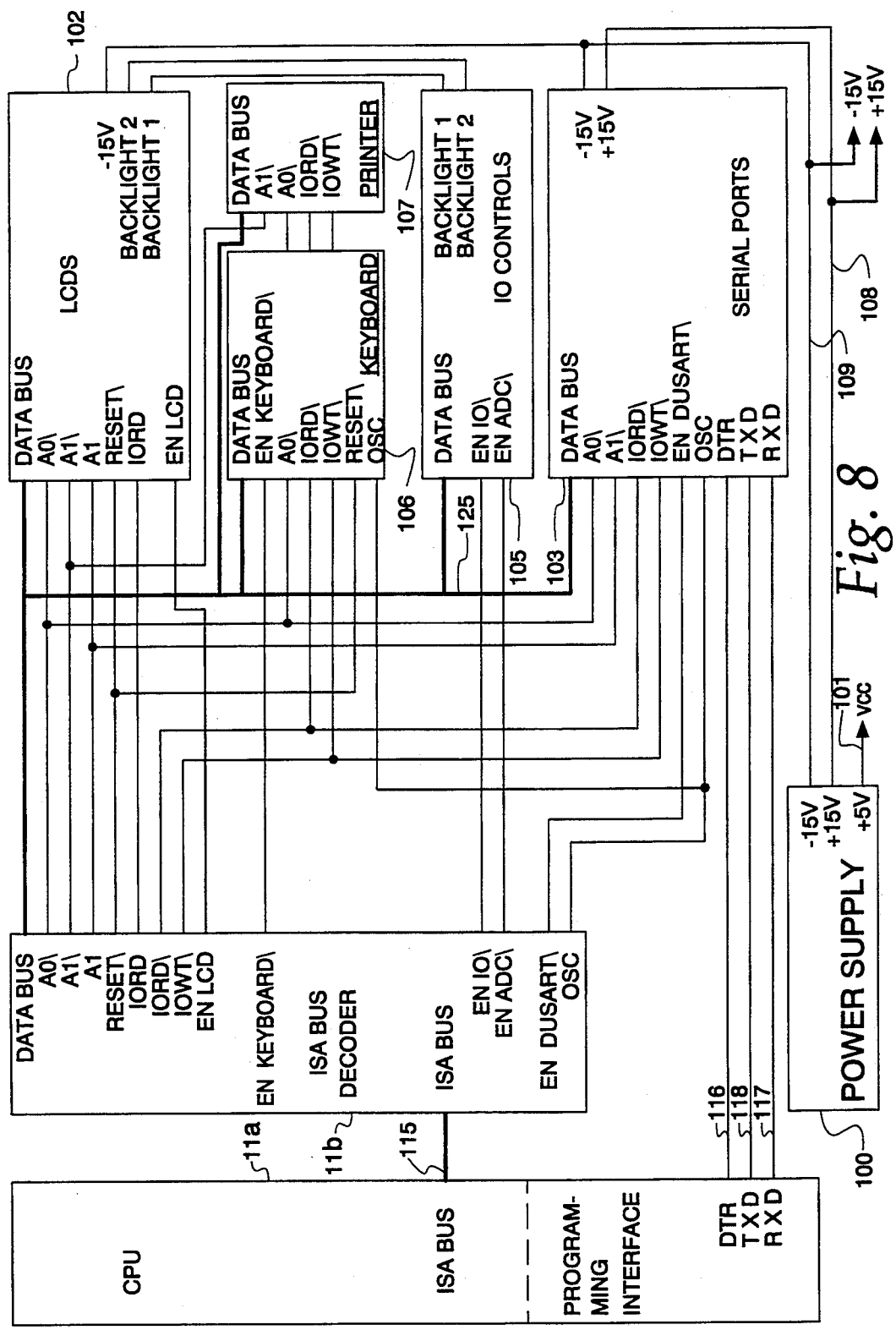
FIG. 8 is a block diagram of computer control circuitry for the system.

To assure that the cassette is properly located so that cassette slide 20 has its opening 61 aligned directly beneath the pin 60 to accept the pin, and the clamping plate is lowered to grip the cassette, there are provided input switches 99a, 99b and 99c, as best seen in FIG. 8. The switch 99a is a normally open limit switch that will be closed when the cassette is pushed fully inward against a stationary stop/go on the housing frame to assure that the sliding opening 61 is at a depth aligned with the pin 61. A similar, normally open limit switch 99b will be closed when the cassette is pushed against a lateral side stop 91 to assure that cassette is laterally over to the right end of the slot 16 to position the slide opening 61 laterally in alignment with the pin 60. To sense that righthand side 18b of the cassette, rather than the lefthand side 18c, is against the lateral stop 91, a limit switch 91c, which is a normally a closed switch, will be open when the limit switch finger is in a groove 93 that is in the sidewall 18b of cassette. The opposite cassette sidewall 18c lacks any such groove. The three switches 91a, 91b and 91c are connected in series and when anyone of the switches is not in its proper position after insertion of the cassette, the circuit is open and this disables and/or causes the computer means not to print and to provide a command on the visual display 38 indicating that the cassette is not properly aligned to receive the pin 60 to open the cassette slide 20.

As best seen in FIG. 7, the slide opening mechanism herein is designed not to be operated by the handle 17 if the pin 60 is not properly coupled to the cassette window slide 20; that is, if the pin 60 does not travel downwardly through a predetermined travel distance, e.g., $\frac{3}{8}$ inch. The pin 60 is attached to the lower end of a vertical plunger 80 slidable in a vertical bore in cylindrical guide boss 81 located on the underside of the clamping plate. The top end of the plunger is biased by a spring 82 secured to the top of the carrier plate 68 by a fastener 83. The illustrated spring is a flat horizontal leaf spring abutting the upper end of the pin plunger 80 and pushing the plunger 80 and the pin 60 down to insert the pin 60 into opening 61 in the cassette slide. When the cassette is properly positioned, the pin 60 is shifted downwardly through the $\frac{3}{8}$ inch displacement needed to insert the pin through the hole in the slide and to push an internal catch member (not shown) on the slide to allow it to travel in the open direction. If the cassette is somehow misaligned, or if the cassette is inverted so that window and slide face down instead of facing up, the pin 60 will not travel down the full extent of the travel distance with the result that the upwardly projecting tab or finger 85 will be in a position to abut the right side of the stationary frame bracket 44 that holds the lens assembly 40. The tab or finger is an integral part of the leaf spring 82 so that, when the spring is lifted by the plunger 80 and attached pin 60, the tab 85 stays upright and will abut the bracket preventing the slide from moving in the slide opening direction. When the pin 60 moves into the opening 61 and unlatches the slide, the tab 85 is lowered to slide below the stationary bracket 44.

Turning now to FIG. 8, the block diagram shown illustrates computer control circuitry used with the system 10. A power supply 100 supplies +5 volts (VCC) via connection 101 and supplies −15 volts and +15 volts via connections 108 and 109, respectively, to supply power to the system 10. In accordance with the invention there is provided an apparatus for printing patient identifying and X-ray machine identifying information onto the X-ray and the X-ray cassette 18 comprising a digital computer and a digital storage device. As embodied herein, the digital computer and digital storage device are provided by CPU 11a connected to ISA bus decoder 11b via bus connection 115. The ISA bus decoder 11b interfaces the CPU 11b to the LCDS block 102, the serial parts block 103, the IO controls 105, the keyboard block 106 and the printer block 107. Details of each of the functional blocks are described below.

Figures 9, 9A:
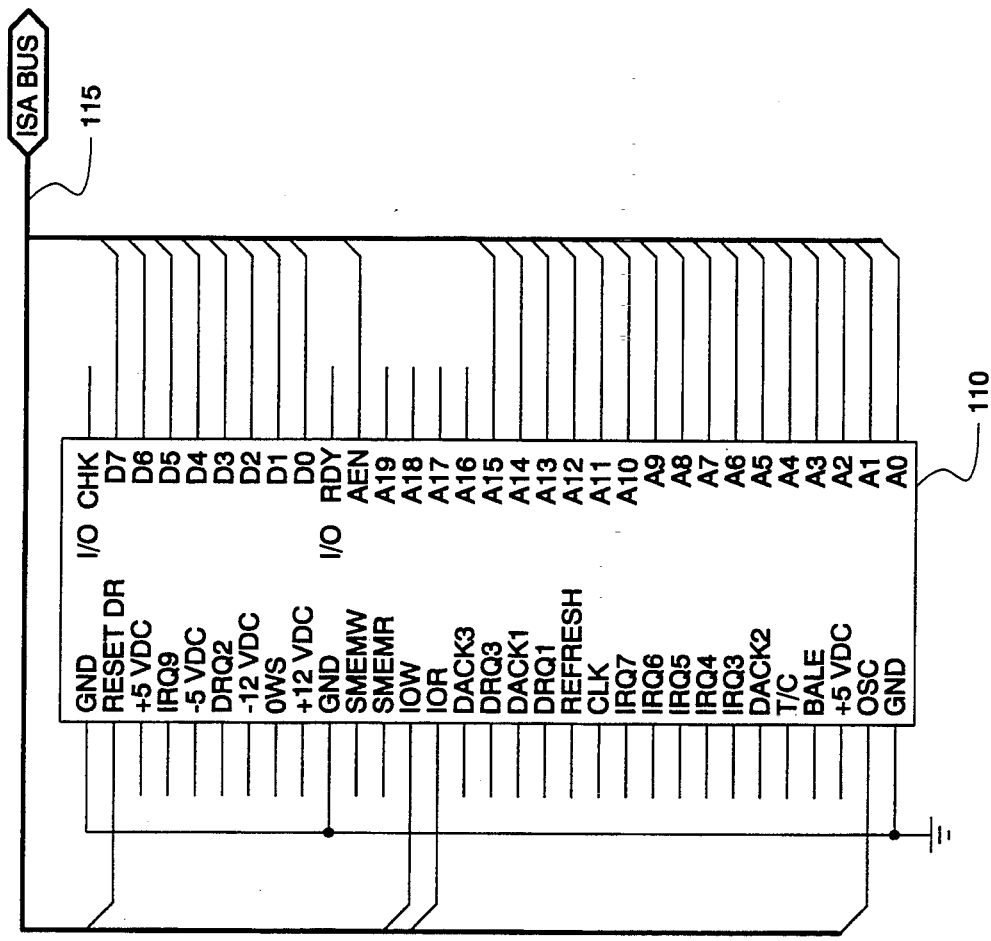
FIG. 9A is a schematic diagram of a 62 pin card edge connector for connection with an industry standard architecture bus (ISA bus)
Figure 9B:
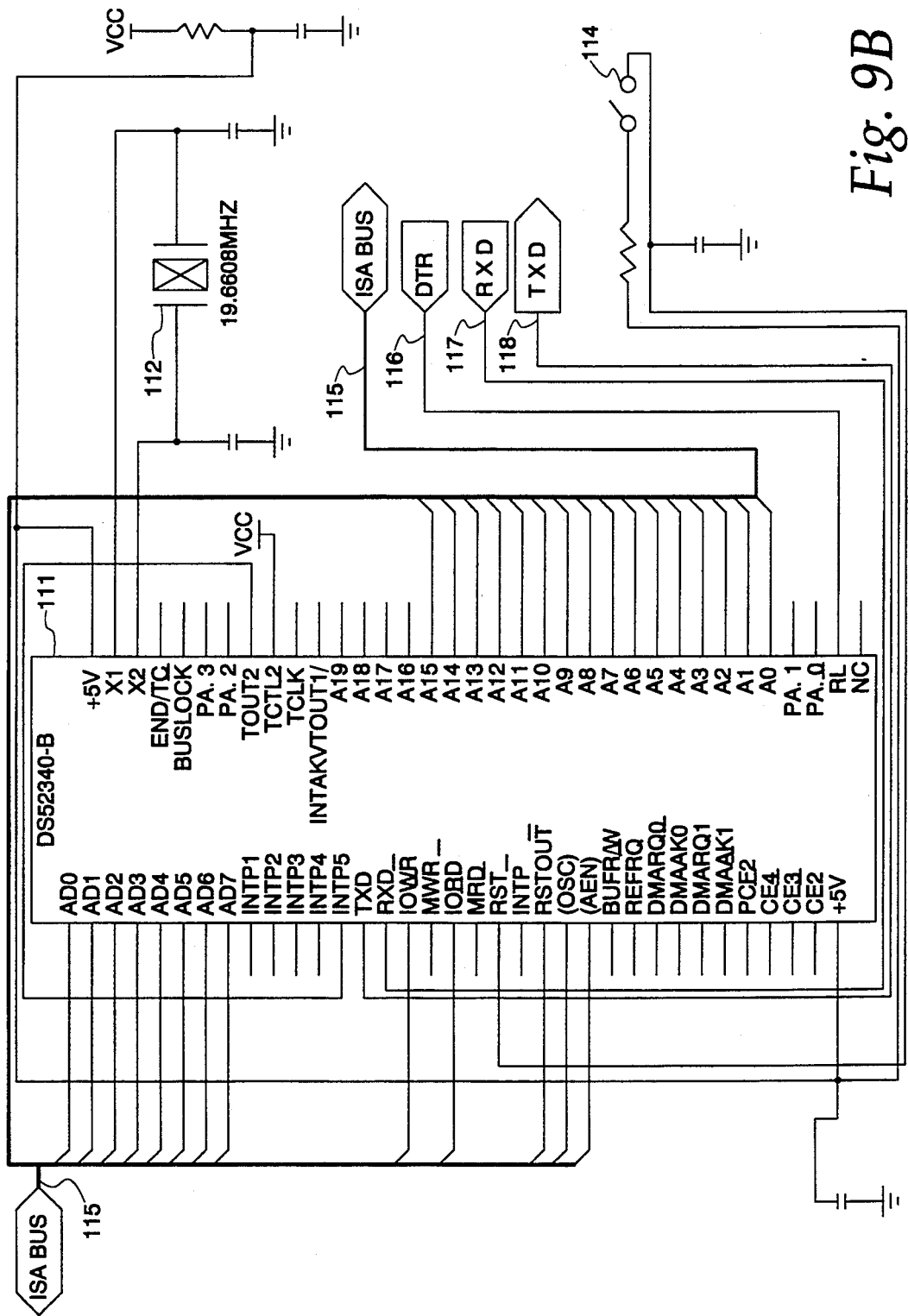
FIG. 9B is a schematic diagram of a Dallas semiconductor DS2340 computer chip including an NEC V40 10 Mhz processor, 256 Kilobyte battery backed RAM, timers and interrupt interfacing.
Figures 10, 10A:
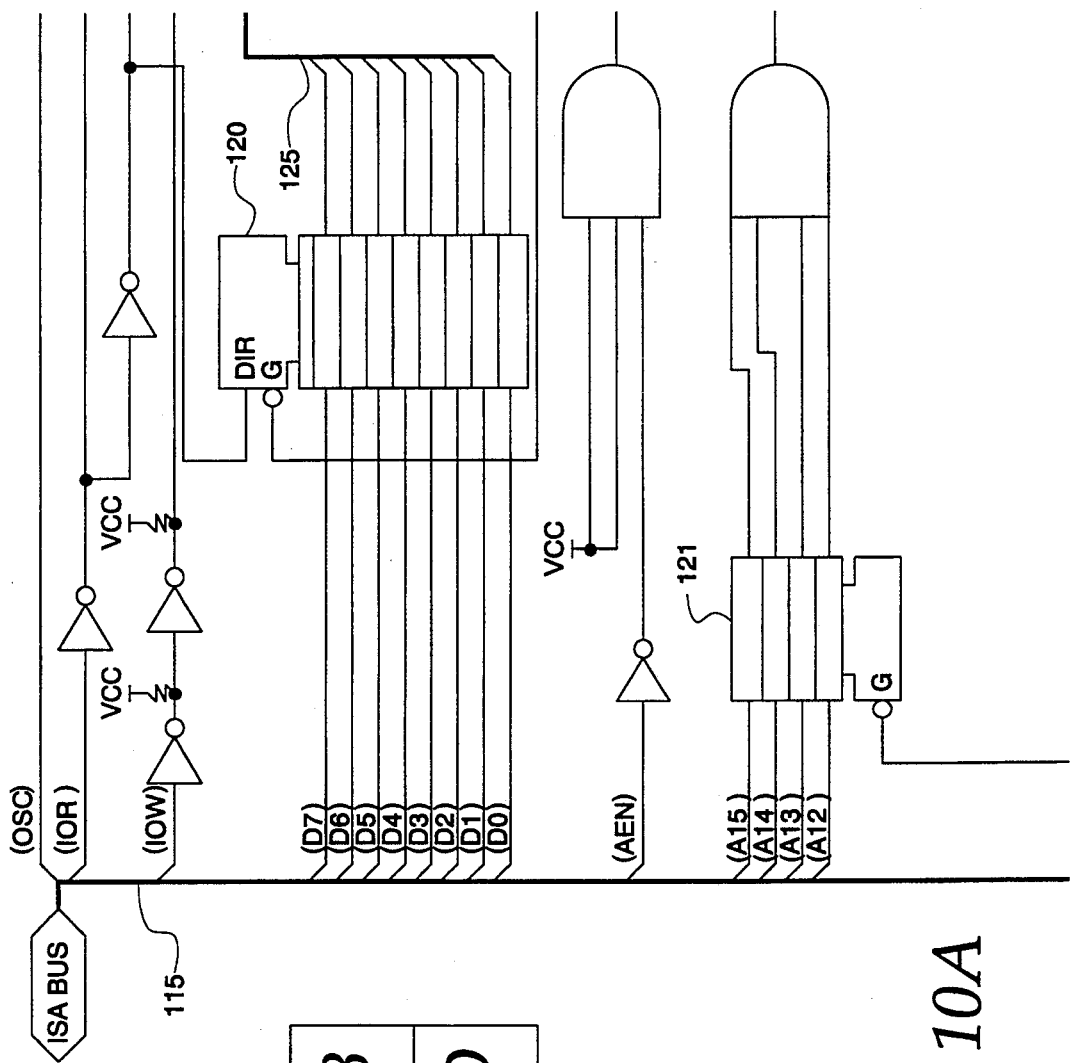
FIGS. 10A-D are schematic diagrams of ISA bus decoder circuitry.
Figure 10B:
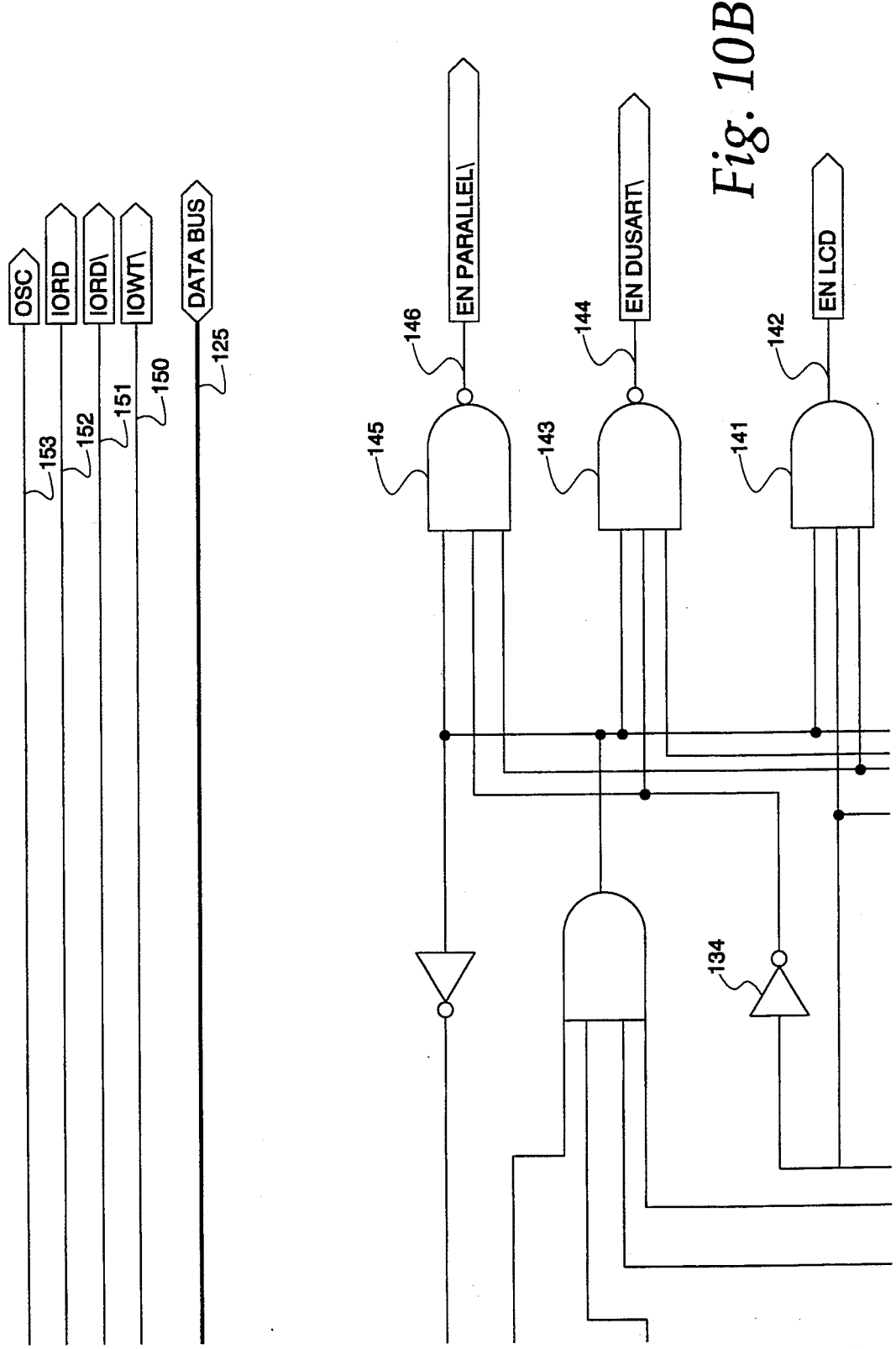
Figure 10C:
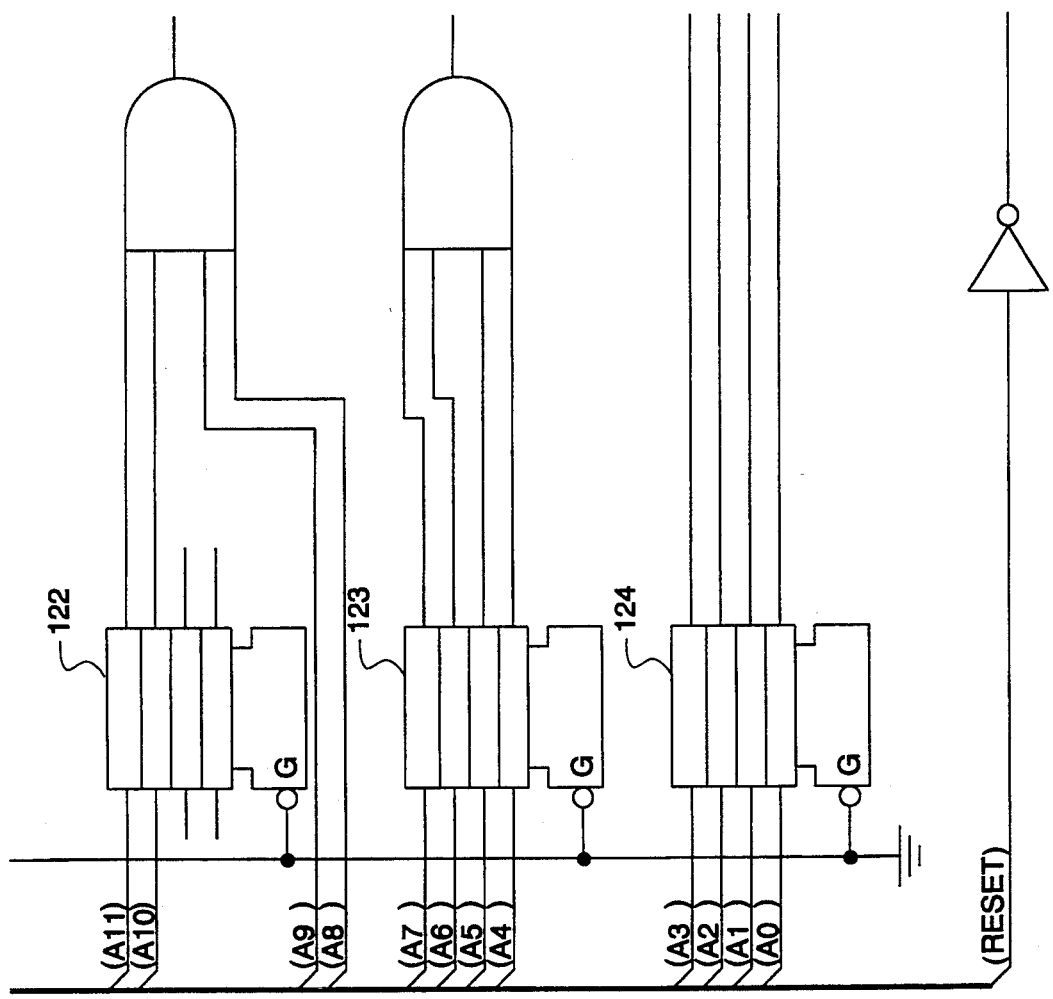
Figure 10D:
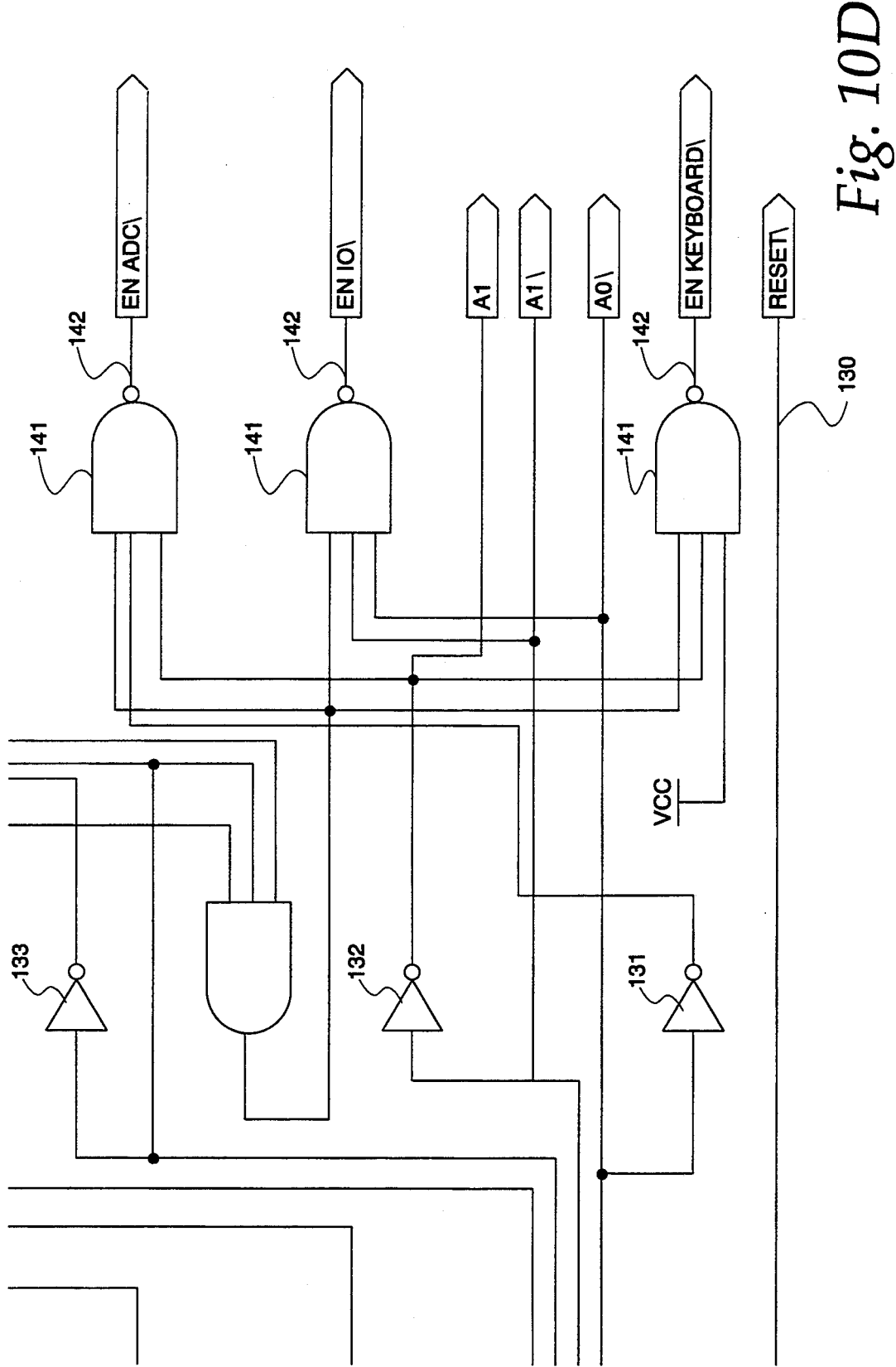

FIGS. 9A and 9B illustrate the block of CPU 11a in greater detail. A 62 pin card edge connector 110 is connected to the industry standard architecture ISA bus 115, providing an IBM type personal computer compatible bus connection which allows a personal computer to be interfaced with the system 10 to provide the digital computer and the digital storage device in accordance with the invention.

FIG. 9B illustrates the ISA bus 115 connected to a DS2340 computer chip 111 which derives its clock signal from a 19.6608 Mhz crystal 112. As embodied herein, the digital computer and digital storage device are provided in the computer chip 111 which are resident on the Dallas semiconductor DS2340 "soft flip stik" which is the computer chip 111. The system CPU of the computer chip 111 is NEC V40 processor.

The computer chip 111 includes an "A" side and a "B". The "B" side has been employed in the embodiment of the present invention and features the V40 10 Mhz processor, a battery backup RAM (up to 256 Kilobytes); hardener module providing watchdog and RAM battery protection and downloading of kernel software. The computer chip 111 provides all system RAM, timers and interrupt interfacing. The "B" side of the computer chip 111 looks like an IBM PC-XT bus and provides an IBM XT compatible personal computer thereby. Further, the PC compatible computer provided herein allows the implementation of security to maintain integrity of the system 10 with access protection requiring the entry of a password. A reset switch 114 is provided to reset the computer chip 111. Programming interface signals including data terminal ready (DTR), receive data (RXD) and transmit data (TXD) are provided via connections 116, 117 and 118, respectively, to facilitate programming of computer chip 111 which will be discussed in further detail below.

As illustrated, the connector 110 of FIG. 9A and the computer chip 111 of FIG. 9B provide alternative means for providing a digital computer and a digital storage device for use with the embodiment.

FIGS. 10A–D are schematic diagrams showing digital circuitry which implements the ISA bus decoder 11b of FIG. 8. In accordance with the invention, the CPU 11a with ISA bus decoder 11b provides a bus connecting the digital storage device, the keyboard 12 and communication ports to the digital computer of CPU 11a. The digital computer and the digital storage device, both resident on the computer chip 111, are connected via a bus within the computer chip 111. As illustrated, address and data signals are latched from the ISA bus 115 and provided as decoded bus signals for use by the system 10. Data signal D0 through data signal D7 are latched with a latch 120, the output of which provides a data bus 125 for D0–D7. Address signal A0 through address signal A15 are latched via latches 121, 122, 123 and 124. As provided herein, all hardware ports are I/O mapped and occupy less than 16 bytes. The details of the I/O interfacing and I/O address bus decoding are shown in FIGS. 10A–10D.

Devices are selected with A4–A15 and particular I/O addresses A0–A3, which have been latched in latch 124. The complements of A0–A3 are provided by inverters 131, 132, 133 and 134, respectively. A three input NAND gate 135 decodes EN KEYBOARD \ 136 at address 0x300 hexidecimal. A NAND gate 137 decodes EN IO \ 138 at address 0x302 hexidecimal. A NAND gate 139 decodes EN ADC \ 140 at address 0x303 hexidecimal. A three input AND gate 141 decodes EN LCD 142 at addresses 0x304 to 0x307 hexidecimal. A three input NAND gate 143 decodes EN USART \ 144 at addresses 0x308 to 0x30b. A three input NAND gate 145 decodes EN PARALLEL \ 146 at addresses 0x30c to 0x30f hexidecimal. Other bus signals derived from the ISA bus 115 with the ISA decoder 11b of FIGS. 10A–10D include A0 \ 126, A1 \ 127, A1 \ 128 and RESET \ 130. Buffered I \ O read and write signals and the oscillator signal (OSC) are provided via connections 150, 151, 152 and 153, respectively.

In accordance with the invention there is provided an optical character projector operable by the digital computer CPU 11a to generate a data image responsive to said patient identifying and X-ray machine identifying information stored in said digital storage device for projection on the X-ray film. As embodied herein, the optical character projector is illustrated in LCDS block 102 in FIG. 8 and comprises the flasher LCD 24 illustrated in detail in the schematic of FIG. 11. Herein the flasher LCD 24 is a Hitachi LCD graphic \ alphanumeric display model no. LMG6381QHGE having backlighting. Various identifying indicia and sequential indicia may be printed on film with the flasher LCD 24. There also is provided an external display for displaying identifying information to a person. As embodied herein, the external display comprises the user LCD 14. Herein the user LCD 14 is a Hitachi LCD graphics \ alphanumeric display model no. LMG6401PLGE having backlighting. The user LCD 14 and flasher LCD 24 are backlit by inverters 61 and 163, respectively. The inverters 161 and 163 are controlled via connections 160 and 162, respectively, which provide signals therefor as BACKLIGHT 1 and BACKLIGHT 2. The LCD backlights are thus computer controlled enabling the digital computer of CPU 11a to control film exposure by the flasher LCD 24 by controlling BACKLIGHT 2 via connection 162. The optical character projector is thereby inhibited by the digital computer after generation of the data image for projection on the X-ray film. The user LCD 14 and flasher LCD 24 are powered via VCC 101 and the −15 volt connection 109.

Figure 12:
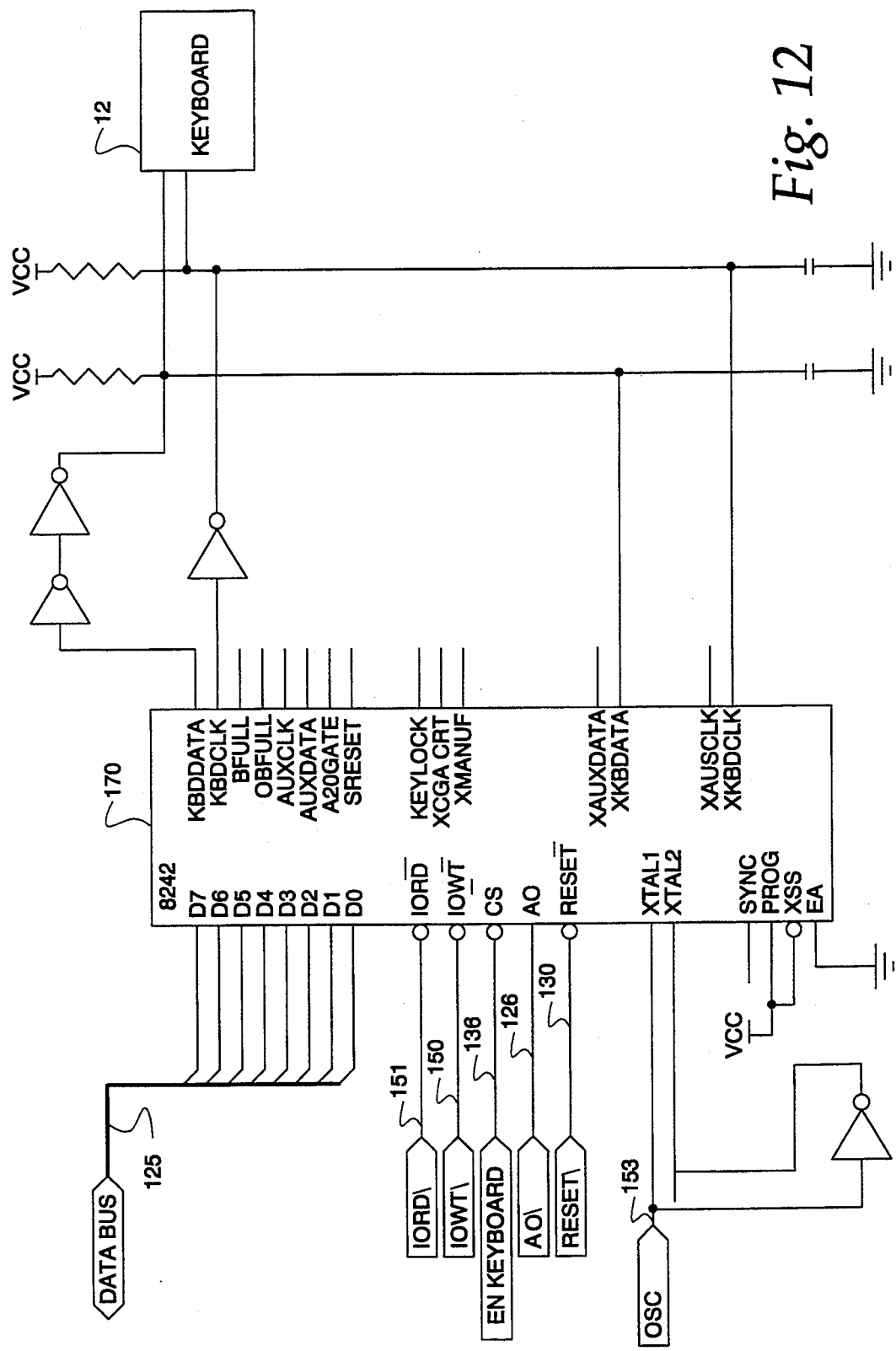
FIG. 12 is a schematic diagram of the keyboard and keyboard control circuitry used in the system.

In accordance with the present invention there is provided a keyboard operable by a person to generate data signals. As embodied herein, such keyboard means is provided in block diagram form in FIG. 8 as keyboard block 106 and illustrated in detailed schematic diagram in FIG. 12. In FIG. 12 the keyboard 12 is interfaced to the ISA bus decoder 11b via a keyboard peripheral interface chip 170, herein the 8042 peripheral device. The interfacing of the keyboard 12 and the system 10 is done in a manner well known in the art.

Figure 13:
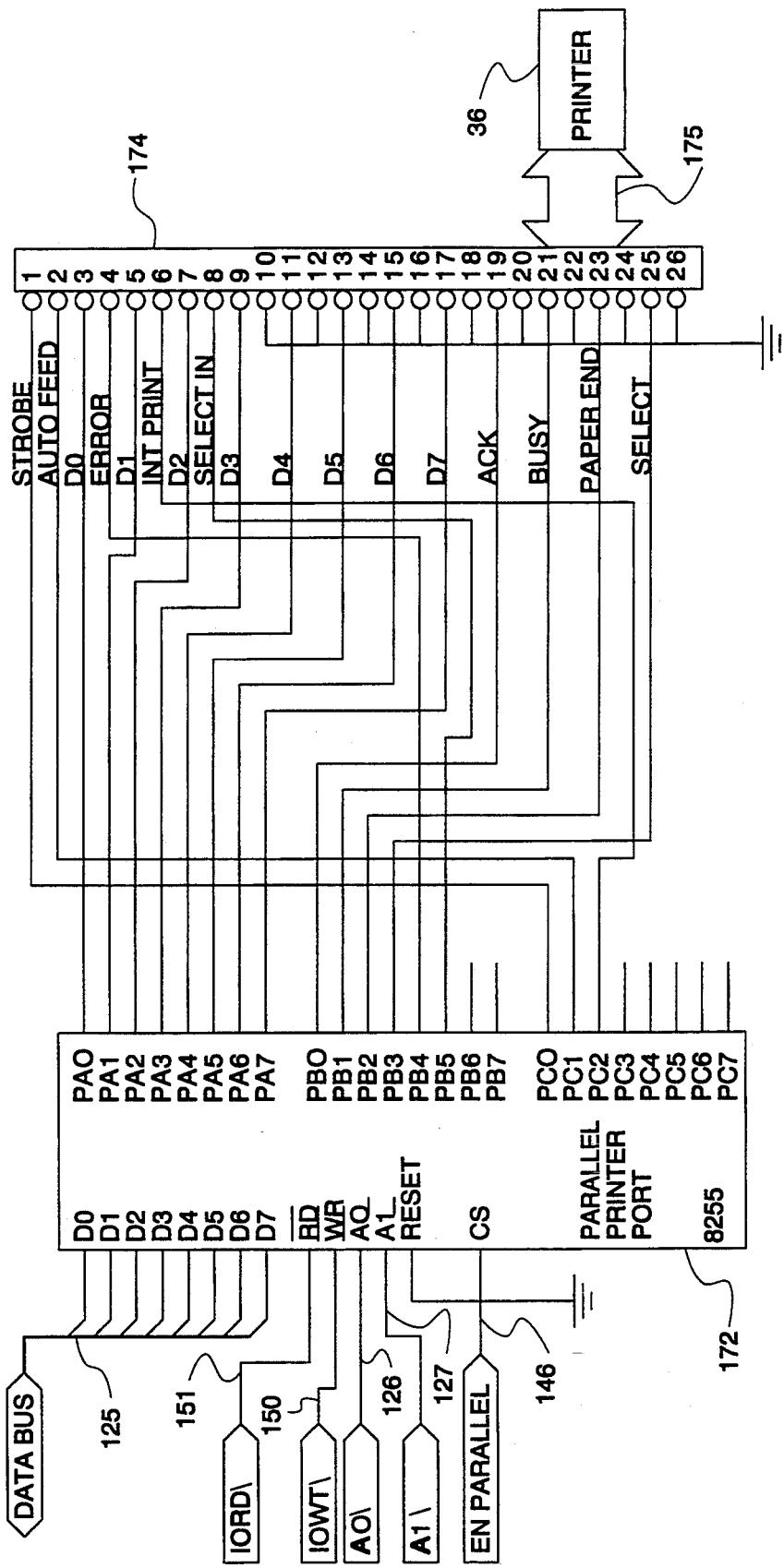
FIG. 13 is a schematic diagram of the printer and parallel printer port used with the system.
Figure 14:
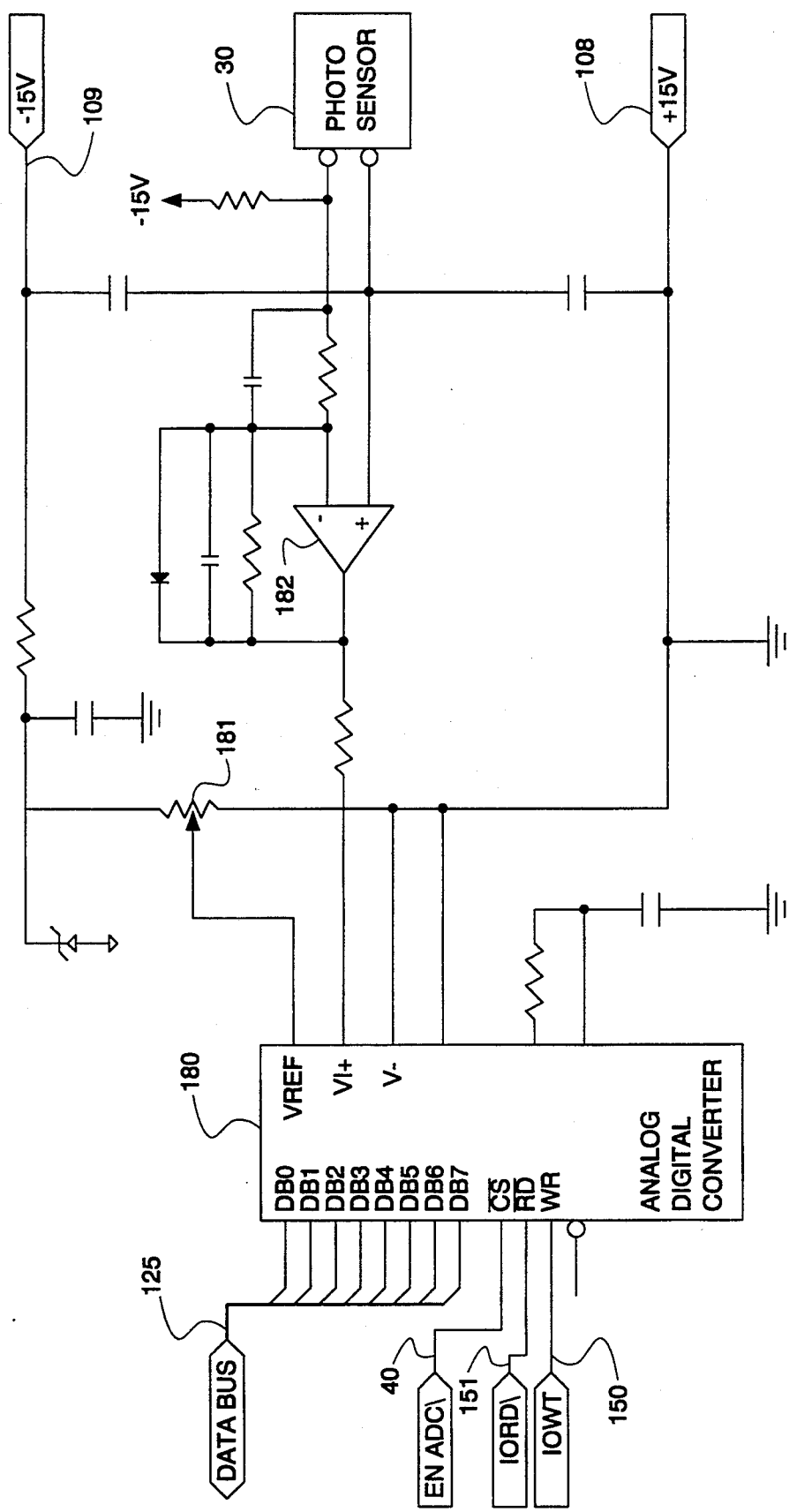
FIG. 14 is a schematic diagram of the photo sensor, amplification, filtering and analog-to-digital (ADC) conversion circuitry used with the system.

There also is provided a printer connected to the digital computer via the data bus 125 for printing information. Accordingly, the digital storage device of the CPU 11a as described above saves the patient identifying and the X-ray machine identifying information for a predetermined period of time. Then, the CPU 11a may retrieve saved patient identifying and X-ray machine identifying information for a predetermined period of time for providing a hard copy printout. Typically, it would be desirable to print out all patient and X-ray information at the end of an operating period, for instance, a day. As embodied herein, printer block 107 of the block diagram of FIG. 8 is shown in detail in FIG. 13 illustrates a parallel port printer interface for sending information via data bus 125 to the printer 36. Additionally, the printer 36 could be connected to any of the serial interface ports discussed below. A parallel printer port 172 is provided as a 8255 peripheral interface chip having three ports A, B and C which are connected to a parallel port connector 174 providing input and output pins according to convention as illustrated in the drawing. The parallel printer port 172 is chip selected with EN PARALLEL 146. A0 \ 126 and A1 \ 127 provide addressing and IORD \ 151 and IOWT \ 150 direct read and write operations to the parallel printer port 172.

A sensor is provided in accordance with the invention for measuring the light output of the flasher LCD backlight, allowing the digital computer of CPU 11a to determine from the sensor the predetermined period of time to expose the X-ray film to provide a proper exposure thereof. As embodied herein, the sensor comprises a photo cell or photo sensor 130 which is amplified and filtered by an operational amplifier 182. The analog signal output of the operational amplifier 182 is analog-to-digital converted via an analog-to-digital convertor (ADC) 180. Conversion voltage reference is provided via a potentiometer 181. Digital data representative of the output of the photo sensor 30 is sent over the data bus 125. The ADC 180 is enabled via EN ADC \ 140 and read and write operations are controlled via IORD \ 151 and IOWT \ 150.

X-ray film exposure, when printing the label, is controlled via the time duration of the flasher LCD backlight 23 of the flasher LCD 24 as discussed above. Of course, a camera shutter means could also be provided for providing the proper exposure to the X-ray film. Advantages are realized, however, by the precise computer control provided when controlling exposure via the backlight 23. For instance, by having a backlight selectively operated by a digital computer to project the data image for a predetermined period of time to expose the X-ray film, by providing X-ray film density to the computer, the computer may determine from the film density the predetermined period of time to expose the X-ray film.

Figure 15B:
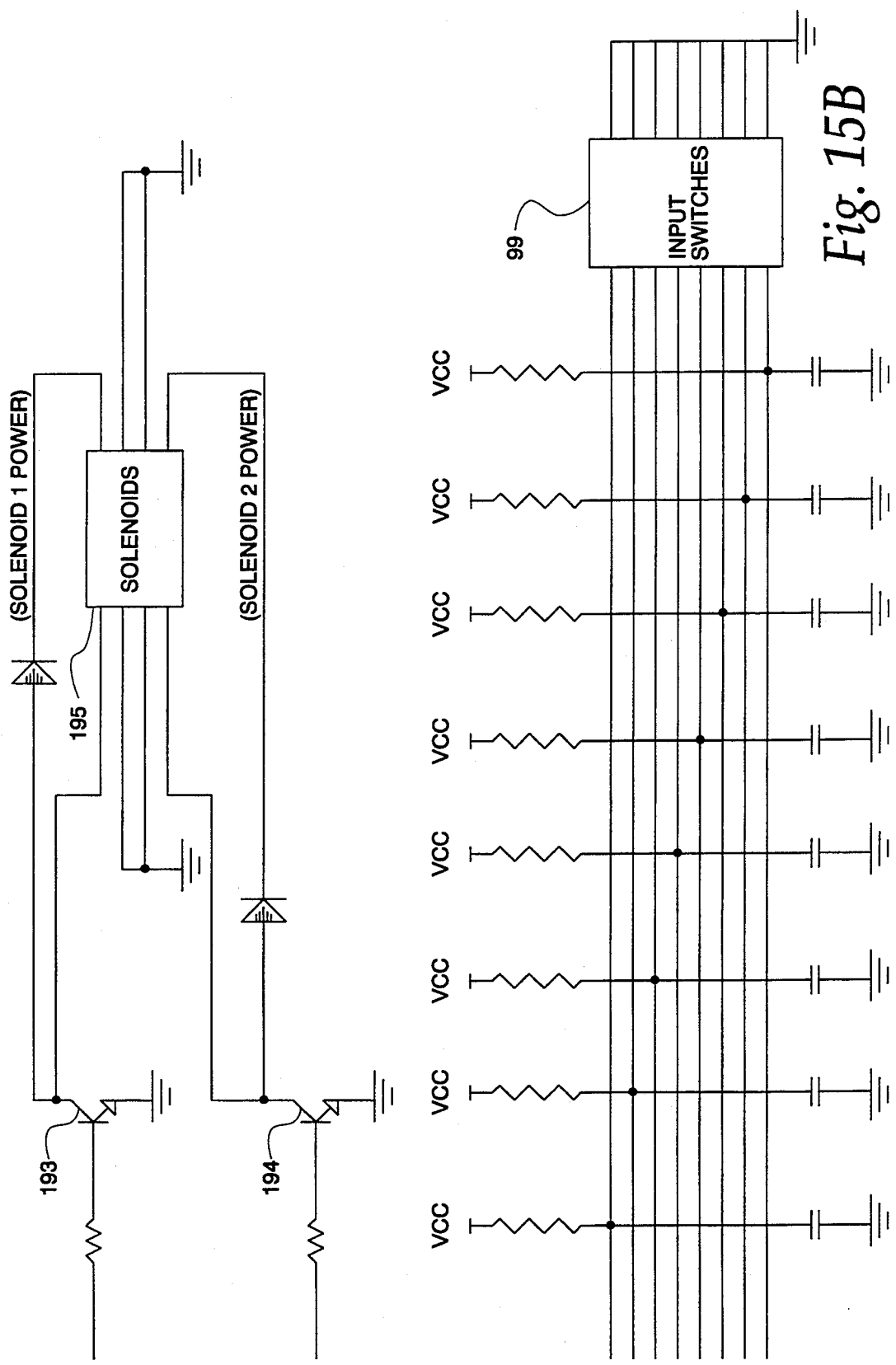

The embodiment described herein includes the handle 17 for exposing the X-ray film operable to open the X-ray cassette 18 when supported by the frame of the housing 15 and slot 16, exposing the X-ray film through the window 19 with the optical character projector of the flasher LCD 24 and backlight 23. As discussed further below, improper operation of the handle 17 is indicated on the user display or user LCD 14. Also in accordance with the invention there may be provided a solenoid responsive to the digital computer for locking the handle 17 while the X-ray cassette 18 is being opened thereby. As embodied herein, solenoids 195 are provided for such control and locking, as indicated in FIGS. 15A and 15B which represent a portion of I \ O controls 105 of FIG. 8. For the operation of solenoids 195, EN IO \ 138 and IOWT \ 150 are ORed and provided as a clocking signal to input data on the data bus 125 to a data register 190. Timers 191 and 192 are connected to the data of the register 190 to provide a time signal of a predetermined duration to activate the solenoids 195 via switching transistors 193 and 194 used for switching power to the solenoids 195.

Figure 11:
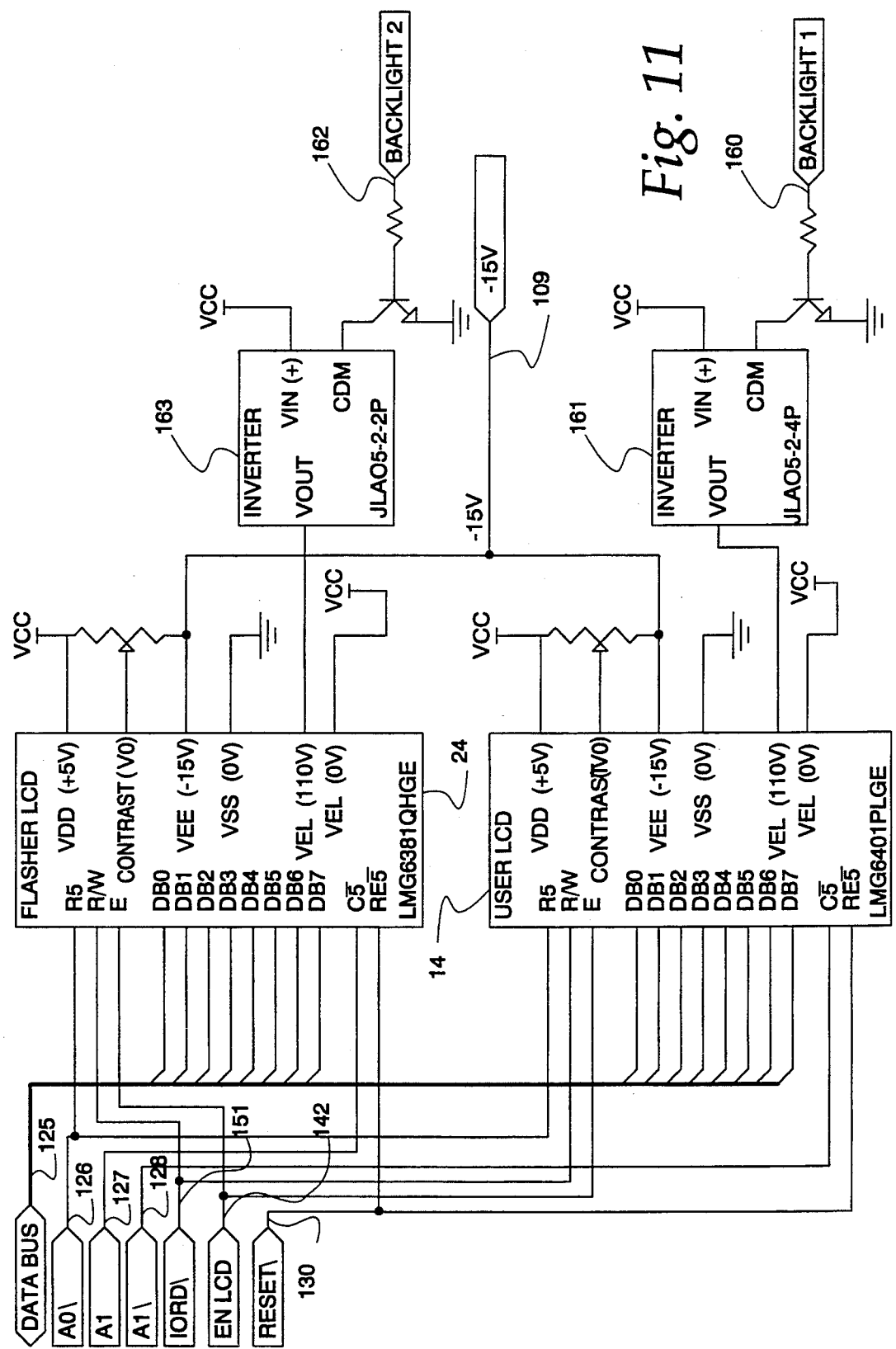
FIG. 11 is a schematic diagram of flasher LCD and user LCD circuitry.

I \ O control data bits D6 and D7 of the data register 190 control BACKLIGHT 1 160 and BACKLIGHT 2 162, respectively, to control the user LCD 14 and the flasher LCD 24, as shown in FIG. 11 above.

Also shown in FIGS. 15A and 15B are means for reading input switches 99 for ascertaining the proper positioning of the X-ray cassette 18 within the slot 16 of the housing 15. As illustrated in FIGS. 15A and 15B, a data register 196 is controlled via EN IO \ 138 and IORD \ 151 to read input switch settings of the input switches 99. Data stored in the register 196 is then communicated via the data bus 125. As illustrated in FIG. 11b, 8 data bits D0–D7 are pulled high to VCC via pullup resistors. Thus, 8 input switches of input switches 99 connected at one end to ground are used to pull down any of the 8 data bits.

Figure 16B:
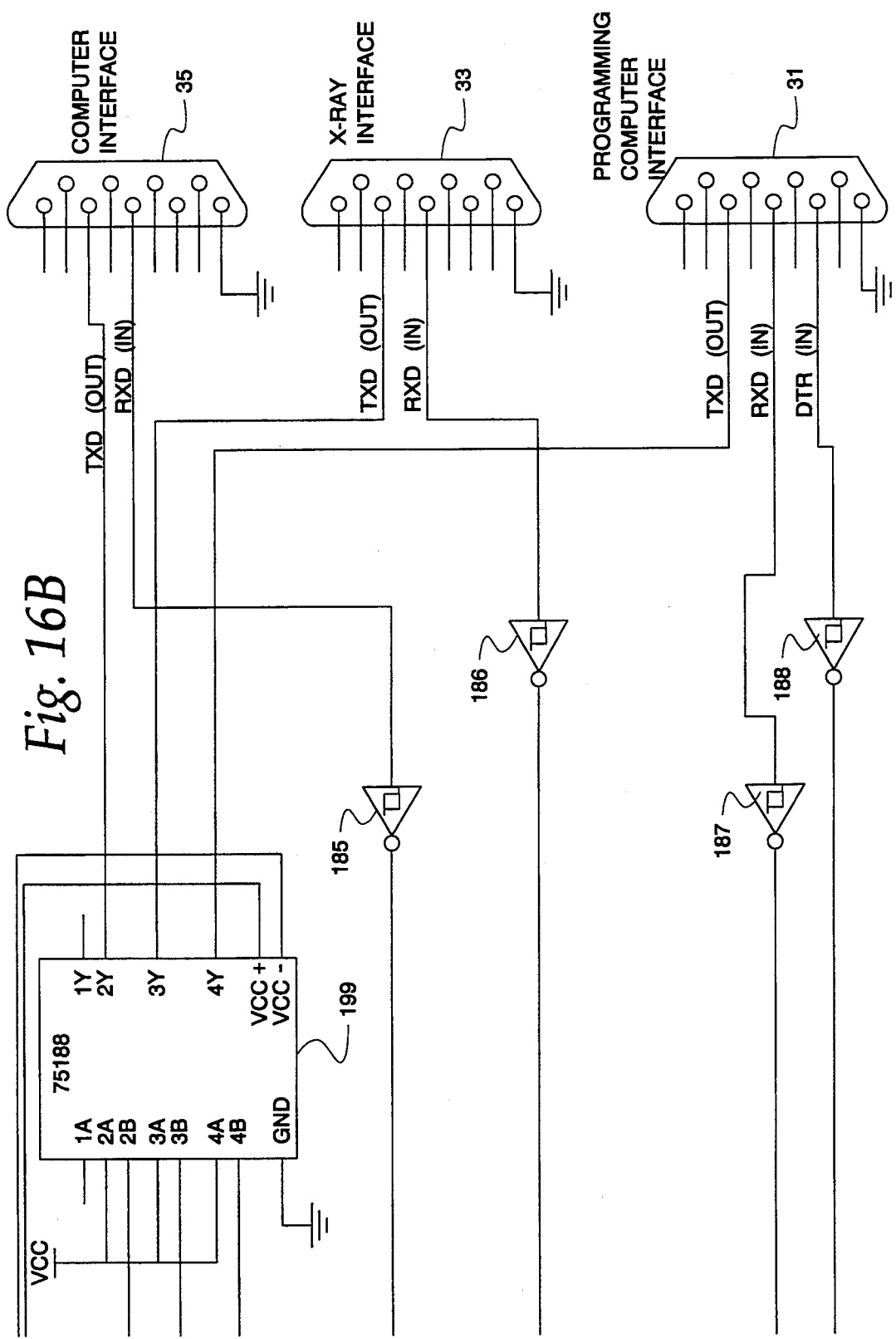
FIGS. 16A and B are schematic diagrams of interface port circuitry.

The serial ports 103 of the block diagram of FIG. 8 are illustrated in schematic diagram form in FIGS. 16A and 16B providing communication means for receiving data signals from remote apparatus. Three (3) RS232 serial interfaces are provided, namely the programing computer interface of port 31, the X-ray interface of port 33 and the computer interface of port 35. The CPU 11a may be programmed via its programming interface which includes DTR 116, RXD 117 and TXD 118 as discussed above. The programming interface of the CPU 11a is used for downloading programs to the CPU 11a via the programming computer interface port 31. The RS232 line receivers are provided as receiver 185 for port 35, receiver 186 for port 33, and receiver 187 for port 31. Additionally, DTR 116 is provided via the programming interface port 31 through line receiver 188, which is removable via a jumper 189.

The X-ray interface port 33 and the computer interface port 35 are provided through a dual universal asynchronous receiver transmitter chip (DUSART) 198, which is a 82530 chip taking data inputs via data bus 125 and clocked via OSC 153 which is divided with a counter 197. DUSART 198 is enabled with EN DUSART 144. A0 \ 126 and A1 \ 127 provide addressing and IORD \ 151 and IOWT \ 150 provide read and write signals for DUSART 198.

Figure 17:
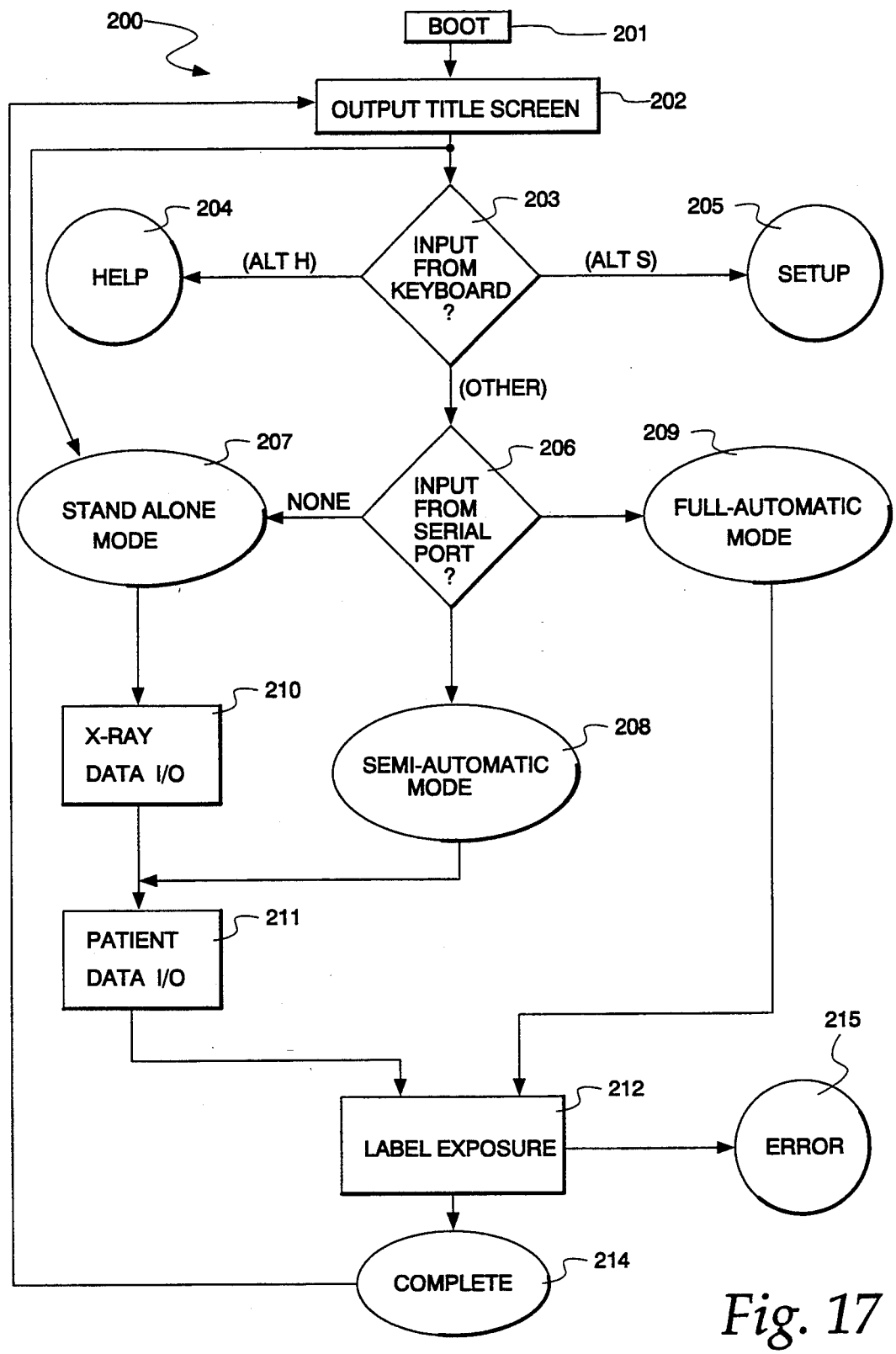
FIG. 17 is a simplified program flow diagram of the system software.

Turning now to FIG. 17, a program flow diagram is generally illustrated at 200. In simplified terms, the flow diagram 200 generally illustrates the principal operation of the software used with the system 10. In particular, the program flow diagram 200 illustrates the three modes of operation of the system 10. As will be described, in accordance with the present invention there is provided means for selecting between the keyboard and the communication port as having the patient identifying and the X-ray machine identifying information present in signals therefrom, thereby defining a stand-alone mode of operation wherein the patient identifying information and the X-ray machine identifying information is present in data signals from the keyboard. A semi-automatic mode is established wherein the X-ray machine identifying information is present in data signals from the communication port, the patient identifying information being made available only via the keyboard. Finally, an automatic mode of operation is provided wherein the patient identifying information as well as the X-ray machine identifying information is present in data signals from the communication port.

The system 10 is initially booted up at boot block 201. Then, program flow proceeds to output title screen 202. By default, the system 10 proceeds to its stand-alone mode 207; however, input from the keyboard 12 determines the program flow of the system 10 at 203 wherein an <AltH> input causes the system 10 to provide user help at help 204. An <AltS> input causes the system 10 to enter setup 205 to select operating parameters for the system 10, as discussed further below. Any other input at the keyboard 12 causes program flow to proceed to block 206 where input from serial ports is ascertained. At this point in the operation of the system 10, information including patient identifying and X-ray machine identifying information may be received via either the X-ray interface port 33 or the computer interface port 35.

If no input is received via ports 33 or 35, the system 10 enters a stand-alone mode 207. Semi-automatic mode is indicated at 208 and full automatic mode is indicated at 209. In semi-automatic mode 208 X-ray data IO is communicated to the system 10, indicating X-ray machine identifying information and parameters via serial port 33 or port 35. In the stand-alone mode 207 the X-ray data IO is received at block 210 via the keyboard 12.

Stand-alone mode 207 and semi-automatic mode 208 then receive patient data IO 211 via the keyboard 12 which provies patient identifying information to the system 10. Full automatic mode 209, on the other hand, requires no input via the keyboard 12 but rather, both X-ray data IO and patient data IO is provided via either port 33 or port 35, requiring no user interaction and hence full automatic mode of operation for the system 10. At label exposure 212 the patient idenfifying and X-ray machine identifying information is printed on the X-ray film and completion is indicated at 214, which returns program flow to output title screen 202. Any erroneous operation in the label exposure 212 program flow is indicated at 215, which will alert the user via user LCD 14. Such erroneous operation may include inappropriate or premature operation of the handle 17, among other things.

The three modes of operation provided in accordance with the present invention, as described with reference to program flow diagram 200, comprises first means for determining whether patient identifying information is present in data signals from the keyboard 12. Additionally, second means for determining whether patient identifying information is present in data signals from the serial communication ports 33 and 35 is also provided. Then, the CPU 11a comprises means responsive to the first and the second patient identifying information determining means for storing patient identifying information in the digitial storage of the CPU 11a. Further, means for determining whether X-ray machine identifying information is present in data signals from the keyboard 12 and means for determining whether X-ray machine identifying information is present in data signals from the serial communication ports 33 and 35 are also provided. The CPU 11a then comprises means responsive to the first and the second X-ray machine identifying information means for storing X-ray machine identifying information in the digital storage of the CPU 11a. The semi-automatic mode of operation provides that the second patient identifying information determining means further determines that X-ray machine identifying information will be present in data signals from the serial communication ports 33 or 35. A more detailed description of the software operation of the system 10 will now be described.

When the software boots, the system 10 displays a title page on the user LCD 14. The contents of the title page appear as follows:

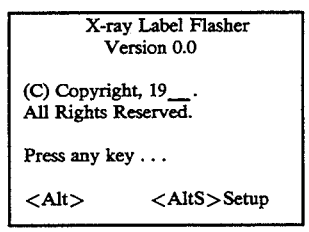

After booting, the system 10 waits for inputs the two serial ports 33, 35. In the absence of an input on either port, the system 10 operates in the stand-alone mode. If the system 10 receives data in a "PC" data format, the system 10 operates via the computer interface port 35 in the PC mode which conforms to a personal computer data protocol. On the other hand, if the system receives data in an "Alpha-RT data format", the system shall operate via the X-ray interface 33 in the Alpha-RT mode. The protocol for the "Alpha-RT data format" is an Instrumentarium protocol corresponding to data from Instrumentarium Alpha-ill and Alpha-RT X-ray machines.

As described in the flow diagram 200 of FIG. 17, depressing the Alt and S keys simultaneously will cause the system 10 to enter the setup mode 205. Setup mode 205 may be entered at any time except while making an X-ray exposure. Depressing the Alt and H keys simultaneously will cause the system 10 to enter help 204. Help may be entered at any time. Pressing any other key will cause the system to enter one of the three operational modes.

Setup mode is used to enter the institution name, and to set the internal real time clock (time of day and date).

Upon entering setup mode 205 the system 10 displays the following screen.

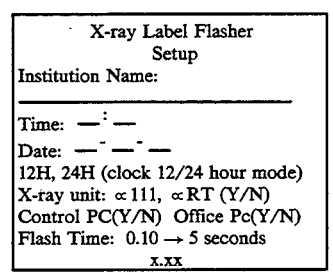

Where the above fields are as follows:
  Institution Name: is the institution name edit field.
  Time: is the present time of day edit field. This field is continuously updated as long as the system 10 in the setup mode 205.
  Date: is the present date edit field.

In the setup mode the user may edit the institution name, the time of day and the date. One jumps from one edit field to another by depressing the enter key. When all edit fields have been satisfactorily edited they are saved by simultaneously depressing the Alt and S keys.

The user scrolls through the film types by depressing the TAB key. The system 10 includes as many types of films as are currently available on the market. The film's exposure time is stored internally in a look up table. The user selects a film type by pressing the enter key when the film type is scrolled into view. The system 10 then displays the setup shown above.

The system 10 returns to the mode it was in prior to entering setup mode when Alt and E are depressed. If any of the data were changed prior to selecting exit without saving the changes the user is prompted with the following screen.

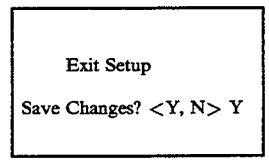

If the user selects "Y" the changes are saved. If the user selects "N" the changes are ignored.

In the stand-alone operation mode 207, the user is allowed to enter and edit patient data on a full screen editor as shown.

```
Institution Name
93-06-16  15:30

Name: ─────────
ID: ─────────
Technologist Initials: ──

NO X-RAY DATA

<AltC>  Clear Entries
<AltH>Help  <AltS>Setup
```

The fields of the stand-alone edit screen are as follows.

| | |
|---|---|
| Institution Name: | is the name of the institution. |
| e.g., 93-06-16: | is the date field. |
| e.g., 15:30: | is the time of day field. |
| Name: | is the patient's name edit field. If the number of characters in the name is more than 18 characters the edit field shall scroll to the left to make the last two characters visible. |
| ID: | is the patient's ID edit field. If the number of characters in the ID is more than 18 characters the edit field shall scroll to the left to make the last two characters visible. |
| Technologist's Initials: | are the technologist's initials edit field. |
| <AltC>Clear: | is an identifier showing that to clear the name and ID edit boxes one must depress the Alt and C keys. The user is first prompted before clearing the two edit fields. |
| <AltH>Help: | is an identifier showing that to see on screen help one must depress the Alt and H keys. |
| <AltS>Setup: | is an identifier showing that to set up the system one must depress the Alt and S keys. |

If a previous patient name, ID or technologist's initials have been entered, they are displayed on the screen and remain displayed until <AltC>Clear is depressed. One jumps through the three edit fields by depressing the enter key. To clear all three patient and technologist data fields the user depresses the Alt and C keys. The user is prompted prior to clearing the fields with the screen shown below.

```
      Clear Patient Data

Clear data? <Y, N> Y
```

If the user selects "Y" the patient data is cleared. If the user selects "N" the patient data is not cleared. If the user selects enter the patient data is cleared.

When the user wishes to expose a label on film cassette 18, the cassette 18 is loaded into the slot 16 and the cassette lever or handle 17 is depressed. Upon depressing the cassette handle 17, the below screen shown is displayed until the film has been exposed. The X-ray data is cleared upon completion or the exposure.

```
    Exposing the X-ray label

Please wait.
```

If the film cassette handle 17 is opened prior to completing the exposure the following error message is displayed.

```
         ERROR!
    The Film Cassette has
    been prematurely
    removed!

The X-ray Label is not
    valid.

Press any key . . .
```

When the exposure is completed the following screen is displayed.

```
    X-ray label completed.

Please open the Cassette
    Lever and remove the
    Film Cassette . . .
```

The system 10 pauses until the user opens the film cassette handle 17 to remove the cassette 18. Upon opening the lever the system returns to display the edit screen shown above. The patient's name, ID and technologist's initials entered earlier will be displayed on the screen. The user may edit the items or continue to expose more film cassettes by repeating the above procedure.

If the system 10 receives either Alpha-RT data or External PC data at any time during the stand-alone operation mode the system automatically switches to either one or the other of the input modes.

Upon receiving "Alpha-RT" formatted data the system 10 enters the ALPHA-RT mode according to the semi-automatic mode 208 or full-automatic mode 209 as described above. If the system 10 is currently exposing an X-ray label while the data is being received, it completes the exposure first before entering the new mode. The following screen is displayed.

```
Institution Name
93-06-16    15:30
Name:―――――――
ID:―――――――
Technologist Initials:―――

X-ray Data<tab>Scroll
Number:     XXXXX
Voltage:    XXkV
Current:    XXXmAs
Time:       X.XXs
Mode:       XXXXXXXX
<AltD> Delete
<AltH>Help    <AltN>Next
```

The fields of the Alpha-RT Mode Edit Screen include the same fields as described above and further added fields as follows.

X-ray Data: is an identifier showing that the following list of data is the X-ray data for the next exposure.

<TAB>Scroll: is an identifier showing that X-ray data list can be scrolled by depressing the TAB key. In the embodiment, only five of the X-ray data fields are shown on the display at one time. Thus to see additional entries one must scroll through the list by depressing the TAB key.

X-ray data fields:
Number: Exposure Number.
Voltage: Voltage in Kv.
Current: Current in MAs.
Time: Exposure time in seconds.
Mode: Exposure modes.
Technique: Techniques.
Angle: C-Arm Angle.
Thickness: Breast thickness in cm.
Force: Compression force in kg.
Filter: The filter type.
Dose: X-ray dose in mGy.

<AltD>Delete: is an identifier showing that the current X-ray exposure data can be deleted by depressing the Alt and D keys. The user is first prompted before deleting the X-ray exposure data.

<AltN>Next: is an identifier showing that there are more X-ray exposures in the buffer and that by depressing Alt N one can view the additional exposures. If there are no other exposures other than the current exposure the <AltN>Next is not displayed.

The user is allowed to edit the patient's name, patient ID and technologist's initials. To change the institution name or time or date, the user must enter setup by depressing <AltS>. To jump between the three edit fields one depresses the enter key. To delete the X-ray exposure data (abort printing of the X-ray label) one depresses the Alt and D keys. The user is first prompted whether or not the X-ray data should be deleted by the screen shown.

```
Delete X-ray Data

Delete data! <Y,N> Y
```

If the user selects "Y" the X-ray data is deleted. if the user selects "N" the X-ray data is not deleted.

To clear the patient name, ID and technologist's initials one depresses the Alt and C key. The user is first prompted whether or not the patient and technologist data should be cleared by displaying the message screen shown above.

If there are additional X-ray exposures stored in the internal buffer (up to 16), the <AltN>Next message is displayed. This message is not displayed if there are no additional exposures. Simultaneously depressing the Alt and N keys displays the next exposure field. A user may use this feature if multiple X-ray exposures have been made without adding a label to the cassettes 18 after each exposure. The user must, however, be certain to maintain the film cassettes 18 in the proper order to ensure that the correct label is made on each cassette 18.

When the user is ready to expose the X-ray film in the Alpha-RT mode, he inserts the cassette 18 into the slot 16 and depresses the cassette locking handle 17. The screens and procedures for exposing the X-ray label in the Alpha-RT mode are identical to the procedures for the stand-alone mode discussed above.

After the X-ray label is exposed, the current X-ray exposure data is removed from the buffer. If there is more exposure data in the buffer, the system 10 displays the remaining exposure data. If there is no more exposure data in the buffer, the system 10 jumps to the stand-alone mode 207.

As previously discussed, upon receiving "PC" formatted data on port 35 the system 10 enters the PC mode for semi-automatic mode 207 or automatic mode 209. If the system 10 is currently exposing an X-ray label while the PC data is being received, it completes the exposure first before entering the new mode.

The user may not edit any of the data fields while in the PC mode. (The data fields are edited using the PC.) The user may scroll through the X-ray data fields by depressing the TAB key. To delete the X-ray exposure data (not print or abort the X-ray label) the user depresses the Alt and D keys. However, as described above, the user is first prompted whether or not the X-ray data should be deleted.

If there are additional X-ray exposures stored in the internal buffer (up to 16), the <AltN>Next message is displayed. This message is not displayed if there are no additional exposures. Simultaneously depressing the Alt and N keys displays the next exposure field. A user may use this feature if multiple X-ray exposures have been made without adding a label to the cassettes 18 after each exposure. The user must, however, be certain to maintain the film cassettes 18 in the proper order to ensure that the correct label is made on each cassette 18.

When the user is ready to expose the X-ray film in the PC mode, the cassette 18 is inserted into the slot 16 and the cassette locking handle 17 is depressed. The screens and procedures for exposing the X-ray label in the PC mode are identical to the procedures for the stand-alone mode discussed above. After the X-ray label is exposed the current X-ray exposure data is removed from the buffer. If there is more exposure data in the buffer the system displays the next exposure. If there is no more exposure data in the buffer, the system jumps to the stand-alone mode 207.

In the event that the system 10 receives data errors through either serial port while inputting data from remote computer apparatus (e.g., either the PC or from the Alpha-RT), the following screen is displayed.

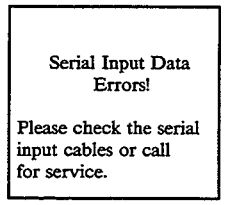

Where, <AltH>Help is an identifier showing that to see on screen help one must depress the Alt and H keys, and <AltE>Exit is an identifier showing that to continue one must depress the Alt and E keys.

Upon depressing the Alt and E keys, the system 10 enters the stand-alone mode 207 until it receives error free data in either the Alpha-RT or PC modes.

There having been described an embodiment of the present invention, other embodiments will be apparent to those skilled in the art from consideration of the specification and practice of the invention disclosed herein. It is intended that the specification be considered as exemplary only with a true scope and spirit of the invention being indicated by the following claims:

What is claimed is:

1. An apparatus for printing data onto X-ray film in an X-ray film cassette having a window opening and a window slide, the apparatus comprising:
   a housing for receiving an X-ray film cassette therein and for supporting the X-ray film cassette during the printing of data onto X-ray film in the X-ray film cassette;
   window opening and closing means for engaging window slide of the X-ray film cassette and for sliding the same between a closed position covering of the X-ray film cassette window opening and an open position in which the window opening is opened to permit printing of data on the X-ray film;
   input means for generating electronic signals representing the data;
   a storage device for storing patient input data for a plurality of patients;
   a display for displaying one of the patient's input data received from the storage device or the input means;
   an optical character generator and projector for receiving the electronic signals and for generating a data image and for projecting the data image through the window opening to print the data onto the X-ray film in the X-ray film cassette; and
   a manual operator operable by a person and movable to actuate the window opening and closing means to allow printing of the data on the X-ray film in the X-ray film cassette; and
   locking means for locking the X-ray film cassette against removal, and actuating means operable by the manual operator for actuating the locking means to lock the X-ray film cassette against removal.

2. An apparatus for printing data onto X-ray film in an X-ray film cassette having a window opening and a window slide, the apparatus comprising:
   a housing for receiving an X-ray film cassette therein and for supporting the X-ray film cassette during the printing of data onto X-ray film in the X-ray film cassette;
   window opening and closing means for engaging a window slide of the X-ray film cassette and for sliding the same between a closed position covering a window opening of the X-ray film cassette and an open position in which the window opening is opened to permit printing of data on the X-ray film;
   input means for generating electronic signals representing the data;
   an optical character generator and projector for receiving the electronic signals and for generating a data image and for projecting the data image through the window opening to print the data onto the X-ray film in the X-ray film cassette;
   a manual operator operable by a person and movable to actuate the window opening and closing means to allow printing of the data on the X-ray film in the X-ray film cassette; and
   locking means for locking the X-ray film cassette against removal, and actuating means operable by the manual operator for actuating the locking means to lock the X-ray film cassette against removal.

3. An apparatus in accordance with claim 2 in which the locking means comprises a movable clamping member moving from a position spaced from the cassette to engage the cassette and to clamp the cassette against withdrawal.

4. An apparatus in accordance with claim 2 in which the locking means includes a movable clamping member which is resilient and deflectable and surrounds the window opening to block ambient light from reaching the X-ray film and which is resiliently compressed against the cassette to resist a pulling of the cassette outwardly from the housing.

5. An apparatus in accordance with claim 1 in which the window opening and closing means comprises a reciprocating member to engage the window slide and to reciprocate the same between open and closed positions, and means including a switch operable by the window opening and closing means shifting the window slide to the open position for enabling the optical character generator and projector to print the X-ray film.

6. An apparatus in accordance with claim 5 in which the reciprocating member comprises a slide shifted by the handle, the slide actuating the switch to enable the printing operation when the slide has travelled through a stroke to open the window slide.

7. An apparatus for printing data onto X-ray film in an X-ray film cassette having a window opening and a window slide, the apparatus comprising:
   a housing for receiving an X-ray film cassette therein and for supporting the X-ray film cassette during the printing of data;
   window opening and closing means for engaging the window slide and for sliding the same between a closed position covering the window opening and an open position in which the window opening is opened to permit printing on the X-ray film;

input means for generating electronic signals representing the data;
an optical character generator and projector for receiving the electronic signals and for generating a data image and for projecting the data image through the window opening to print the data onto the X-ray film in the X-ray film cassette;
a manual operator operable by a person and movable to actuate the window opening and closing means to allow printing of the data on the X-ray film in the X-ray film cassette; and
window sensing means for sensing whether or not the X-ray film cassette is positioned with the window opening facing the optical character generator and projector.

8. An apparatus in accordance with claim 7 in which the window sensing means comprises a pin movable through a predetermined distance to couple itself to the window slide when the window is properly positioned, and stop means stopping a further movement of the handle if the pin does not travel through the predetermined distance.

9. An apparatus in accordance with claim 8 in which a spring biases the pin to travel through the predetermined distance into the window slide and in which a blocking means blocks travel of the slide if the cassette is not properly positioned.

10. An apparatus for printing data onto X-ray film in an X-ray film cassette having a window opening and a window slide, the apparatus comprising:
a housing for receiving an X-ray film cassette therein and for supporting the X-ray film cassette during the printing of data;
window opening and closing means for engaging the window slide and for sliding the same between a closed position covering the window opening and an open position in which the window opening is opened to permit printing on the X-ray film;
input means to generate electronic signals representing the data;
an optical character generator and projector for receiving the electronic signals and for generating a data image and for projecting the data image through the window opening to print the data onto the x-ray film in the cassette; a manual operator operable by a person and movable to actuate the window opening and closing means to allow printing of the data on the X-ray film in the cassette;
first switch means for sensing if the X-ray film cassette is fully inserted, second switch means for sensing if the window opening of the X-ray film cassette is facing the proper direction, and third switch means for sensing a lateral side of the X-ray film cassette, and means for disabling the printing operation if the respective switch means are not properly actuated.

11. A flasher apparatus to be used to generate and print characters onto an X-ray film through a window in an X-ray film cassette, said apparatus comprising:
a housing having a slot to receive a cassette that is slid therein;
cassette sensing means for sensing that the cassette is properly inserted and oriented for a printing operation;
computing means; means for connecting the computing means to the cassette sensing means for disabling or enabling a printing operation;
window opening and closing means in the housing for engaging a window slide of the cassette and for moving the same between a closed position and an open position in which the window is open to permit printing on the X-ray film;
optical character generator and projector means responsive to the computing means having an LCD and controlled thereby for generating on the X-ray film a latent data image having multiple lines of data;
a lens system in said optical character generator and projector means to project the image with clarity and contrast to print said data onto the X-ray film in multiple lines of data; and
locking means to immobilize the cassette during the printing operation by the LCD when the window is open.

12. An apparatus in accordance with claim 11 including a printer connected to the computing means, and storage means in the computer for storing therein the data generated for each cassette; and
means in the computing means to cause the storage means to deliver the stored data to the printer and to cause the printer to print out on paper a list having the previously printed patient cassette data therein.

13. An apparatus in accordance with claim 12 in which the stand-alone flasher apparatus has ports in said computing means for connection to a remote printer and to a remote computer associated with a mammography machine.

14. An apparatus in accordance with claim 13 wherein the slot for the cassette is disposed to receive a cassette in a horizontal position in the housing with the window opening being disposed vertically, means for backlighting the LCD to project latent image defining light along a horizontal image path, and a mirror for redirecting the horizontal image path vertically through the window in the cassette.

15. A flasher apparatus to be used to generate and print characters onto an X-ray film through a window in an X-ray film cassette, said apparatus comprising:
a housing having a slot to receive a cassette that is slid therein;
cassette sensing means in the housing for sensing that the cassette is properly inserted and oriented for a printing operation;
computing means connected to the cassette sensing means for disabling or enabling a printing operation;
window opening and closing means in the housing for engaging a window slide of the X-ray film cassette and for moving the same between a closed position and an open position in which the window is open to permit printing on the X-ray film;
optical character generator and projector means having an LCD controlled thereby for generating on the X-ray film a latent data image having multiple lines of data;
a lens system and filter in said optical character generator and projector means to project the image with clarity and contrast to print said data onto the X-ray film in multiple lines of data; and
a manual operator operated by the operator to lock the cassette against removal and to actuate the window opening and closing means to slide the window slide open and closed.

16. An apparatus in accordance with claim 15 in which a sensing means senses that the lever handle has caused the window to be fully opened and provides an input to the computing means indicating that the window is fully open.

17. An apparatus in accordance with claim 15 including a keyboard for entry of data and a storage means in the computing means having stored therein a list of patient data for scrolling to associate the cassettes to be exposed with appropriate patient data.

18. An apparatus in accordance with claim 15 wherein the filter is a yellow filter and the lens is a 3-inch and three-element lens system having a focal ration of f/2.5.

19. An apparatus in accordance with claim 11 further comprising means in the computing means for preventing a second operation of the optical character generator and projector for generating and printing a second time previously printed X-ray exposure data.

* * * * *

UNITED STATES PATENT AND TRADEMARK OFFICE
CERTIFICATE OF CORRECTION

PATENT NO. : 5,416,823
DATED : May 16, 1995
INVENTOR(S) : Livingston

It is certified that error appears in the above-indentified patent and that said Letters Patent is hereby corrected as shown below:

On the title page, item [54] and column 1, line 2, change "Making" to --Marking--.

Column 23, line 43, after "engaging" add --a--.

Column 25, line 45, change "x-ray" to --X-ray--.

Column 23, lines 61-68, delete the last two paragraphs of Claim 1 and insert --a manual operator exposed on the exterior of the housing for operation manually independently of the cassette by a person having viewed the data for errors on the display and movable to cause the printing of the data on the X-ray film in the X-ray film cassette--.

Column 26, line 61, after "and" add --a--.

Column 28, line 4, change "ration" to --ratio--.

Signed and Sealed this

Fifth Day of September, 1995

Attest:

BRUCE LEHMAN

*Attesting Officer*  *Commissioner of Patents and Trademarks*